(12) United States Patent
Uchimura et al.

(10) Patent No.: US 11,416,839 B2
(45) Date of Patent: Aug. 16, 2022

(54) CHECKOUT DEVICE, CONTROL METHOD, AND STORAGE MEDIUM

(71) Applicant: NEC Corporation, Tokyo (JP)

(72) Inventors: Jun Uchimura, Tokyo (JP); Yoshihiro Itou, Tokyo (JP); Kazuki Miura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/270,536

(22) PCT Filed: Aug. 21, 2019

(86) PCT No.: PCT/JP2019/032685
§ 371 (c)(1),
(2) Date: Feb. 23, 2021

(87) PCT Pub. No.: WO2020/045196
PCT Pub. Date: Mar. 5, 2020

(65) Prior Publication Data
US 2021/0192486 A1 Jun. 24, 2021

(30) Foreign Application Priority Data
Aug. 30, 2018 (JP) .............................. JP2018-161639

(51) Int. Cl.
*G06Q 20/20* (2012.01)
*G06Q 20/18* (2012.01)
(Continued)

(52) U.S. Cl.
CPC .......... *G06Q 20/208* (2013.01); *G06Q 20/18* (2013.01); *G07G 1/0009* (2013.01);
(Continued)

(58) Field of Classification Search
CPC .... G06Q 20/208; G06Q 20/18; G06Q 20/203; G06Q 20/209; G07G 1/0009;
(Continued)

(56) References Cited

U.S. PATENT DOCUMENTS 9,494,970 B2 * 11/2016 Truong ................. G06F 1/1601
2002/0023005 A1 2/2002 Tanaka et al.
(Continued)

FOREIGN PATENT DOCUMENTS

JP 2001-076261 A 3/2001
JP 2002-063659 A 2/2002
(Continued)

OTHER PUBLICATIONS

NCR FastLane SelfServ Checkout Express Convertible Datasheet. Retrieved from <https://www.ncr.com/content/dam/ncrcom/content-type/datasheets/RET_FastLane-ssco-express-convertable-ds.pdf>. 2014. (Year: 2014).*
(Continued)

*Primary Examiner* — Nathan A Mitchell

(57) ABSTRACT

Provided are a checkout device, a control method, and a storage medium that can smoothly perform a checkout process for a customer in accordance with a status. The checkout device includes: a first input/output unit; a second input/output unit provided to face a different direction from the first input/output unit; and a control unit that selects an input/output unit which accepts input related to a checkout process from the first input/output unit and the second input/output unit based on at least one of status of the checkout device and time.

10 Claims, 10 Drawing Sheets

(51) Int. Cl.
*G07G 1/00* (2006.01)
*H04N 7/18* (2006.01)
*G06K 7/10* (2006.01)
*G07G 5/00* (2006.01)

(52) U.S. Cl.
CPC .......... *G07G 1/0045* (2013.01); *H04N 7/183* (2013.01); *G06K 7/10297* (2013.01); *G06K 7/10861* (2013.01); *G06K 2007/10504* (2013.01); *G06Q 20/203* (2013.01); *G06Q 20/209* (2013.01); *G07G 5/00* (2013.01)

(58) Field of Classification Search
CPC .......... G07G 1/0045; G07G 5/00; G07G 3/00; G07G 3/003; G07G 1/14; H04N 7/183; G06K 7/10297; G06K 7/10861; G06K 2007/10504
See application file for complete search history.

(56) References Cited

U.S. PATENT DOCUMENTS

| | | | |
|---|---|---|---|
| 2003/0006098 A1* | 1/2003 | Wike, Jr. | G07G 1/0036 186/61 |
| 2003/0018897 A1* | 1/2003 | Bellis, Jr. | G06Q 20/40145 713/182 |
| 2007/0235531 A1* | 10/2007 | Addison | G07G 1/0036 235/383 |
| 2009/0101713 A1* | 4/2009 | Ulrich | G06Q 20/208 235/383 |
| 2009/0198582 A1 | 8/2009 | Tokorotani | |
| 2011/0225056 A1* | 9/2011 | Akiyama | G07G 1/01 705/16 |
| 2013/0153656 A1* | 6/2013 | Skiles | G07G 1/009 235/383 |
| 2016/0253647 A1* | 9/2016 | Gotanda | G07G 1/01 705/17 |
| 2017/0316397 A1* | 11/2017 | Miyagi | G06F 21/32 |
| 2018/0068291 A1* | 3/2018 | Kakino | G06Q 20/18 |
| 2020/0027070 A1* | 1/2020 | Ogawa | G06Q 20/206 |
| 2020/0035070 A1* | 1/2020 | Ogawa | G07G 1/0009 |
| 2020/0380489 A1* | 12/2020 | Saitoh | G06F 3/0416 |

FOREIGN PATENT DOCUMENTS

| | | |
|---|---|---|
| JP | 2004-252865 A | 9/2004 |
| JP | 2009-020667 A | 1/2009 |
| JP | 2009-187078 A | 8/2009 |
| JP | 2011-003150 A | 1/2011 |
| JP | 2011-100371 A | 5/2011 |
| JP | 2014-160493 A | 9/2014 |
| JP | 2016-115202 A | 6/2016 |
| JP | 2017-199188 A | 11/2017 |
| JP | 2018-101364 A | 6/2018 |
| JP | 2018-109932 A | 7/2018 |
| JP | 2019-174857 A | 10/2019 |

OTHER PUBLICATIONS

Translation of JP2001076261. Generated on Dec. 14, 2021 using EPO portal. (Year: 2001).*
Translation of JP2018109932. Generated on Dec. 14, 2021 using EPO portal. (Year: 2018).*
International Search Report for PCT Application No. PCT/JP2019/032685, dated Nov. 5, 2019.

* cited by examiner

FIG. 2
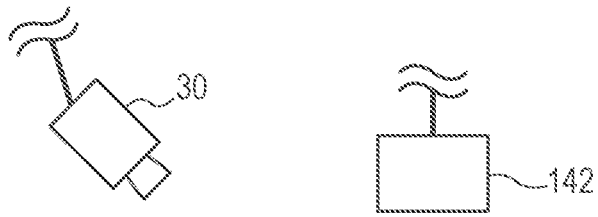
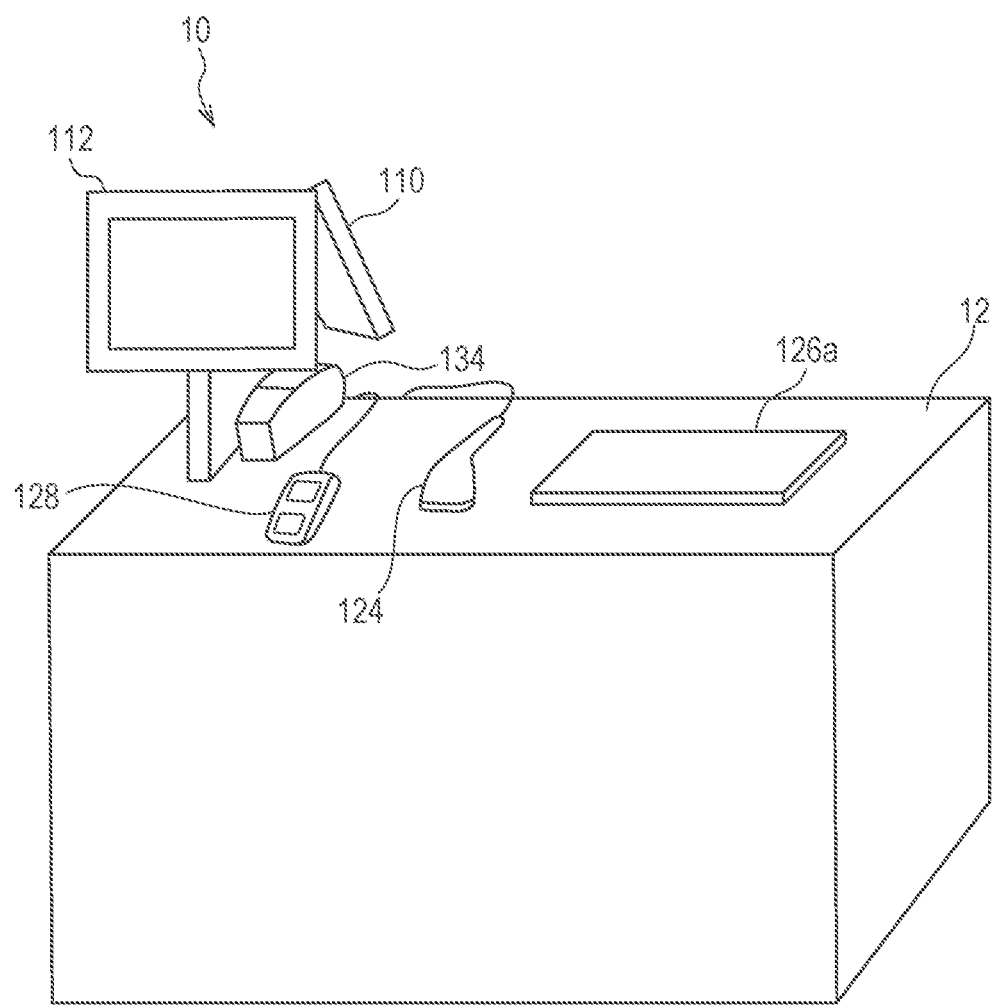

CHECKOUT DEVICE, CONTROL METHOD, AND STORAGE MEDIUM

This application is a National Stage Entry of PCT/JP2019/032685 filed on Aug. 21, 2019, which claims priority from Japanese Patent Application 2018-161639 filed on Aug. 30, 2018, the contents of all of which are incorporated herein by reference, in their entirety.

TECHNICAL FIELD

The present invention relates to a checkout device, a control method, and a storage medium.

BACKGROUND ART

Patent Literature 1 discloses a self-service register system including a register terminal that can be switched to a self-service register mode in which not only a salesclerk but also a customer may operate the register terminal by himself/herself. In the self-service register system disclosed in Patent Literature 1, when there is a register terminal which the salesclerk is unable to cope with, the salesclerk operates a self-service register setting function if necessary and switches the register terminal to a self-service register terminal.

CITATION LIST

Patent Literature

PTL 1: Japanese Patent Application Laid-open No. 2001-076261

SUMMARY OF INVENTION

Technical Problem

In the self-service register system disclosed in Patent Literature 1, it is necessary for a salesclerk to switch a register terminal to a self-service register terminal in order for a customer to use the register terminal as the self-service register terminal. Therefore, in the self-service register system disclosed in Patent Literature 1, it is difficult to smoothly perform a checkout process for the customer in accordance with the status since it is difficult to suitably switch the register terminal between a manned register and a self-service register in accordance with the status.

In view of the problem described above, the example object of the present invention is to provide a checkout device, a control method, and a storage medium that can smoothly perform the checkout process for the customer in accordance with the status.

Solution to Problem

According to one example aspect of the present invention, provided is a checkout device including: a first input/output unit; a second input/output unit provided so as to face a different direction from the first input/output unit; and a control unit that selects an input/output unit which accepts input related to a checkout process from the first input/output unit and the second input/output unit based on at least one of status of the checkout device and time.

According to another example aspect of the present invention, provided is a checkout device configured to switch an operation mode to a first mode in which product registration is performed by a salesclerk for a product purchased by a customer or a second mode in which product registration is performed by the customer, and the checkout device includes: a first reading unit that reads product information on the product; a second reading unit that reads product information on the product in a scheme that is different from a scheme of the first reading unit; and a reading control unit that controls the first reading unit and the second reading unit in accordance with the operation mode.

According to yet another example aspect of the present invention, provided is a control method of a checkout device having a first input/output unit and a second input/output unit provided so as to face a different direction from the first input/output unit, and the control method includes: selecting an input/output unit which accepts input related to a checkout process from the first input/output unit and the second input/output unit based on at least one of status of the checkout device and time.

According to yet another example aspect of the present invention, provided is a storage medium storing a program that causes a checkout device having a first input/output unit and a second input/output provided so as to face a different direction from the first input/output unit to select an input/output unit which accepts input related to a checkout process from the first input/output unit and the second input/output unit based on at least one of status of the checkout device and time.

Advantageous Effects of Invention

According to the present invention, a checkout process for a customer may be performed smoothly in accordance with the status.

BRIEF DESCRIPTION OF DRAWINGS

FIG. 2 is a schematic diagram illustrating a configuration of the checkout device according to the first example embodiment of the present invention.

DESCRIPTION OF EMBODIMENTS

First Example Embodiment

A checkout device and a control method of the checkout device according to a first example embodiment of the present invention will be described with reference to FIG. 1 to FIG. 5.

Figure 1:
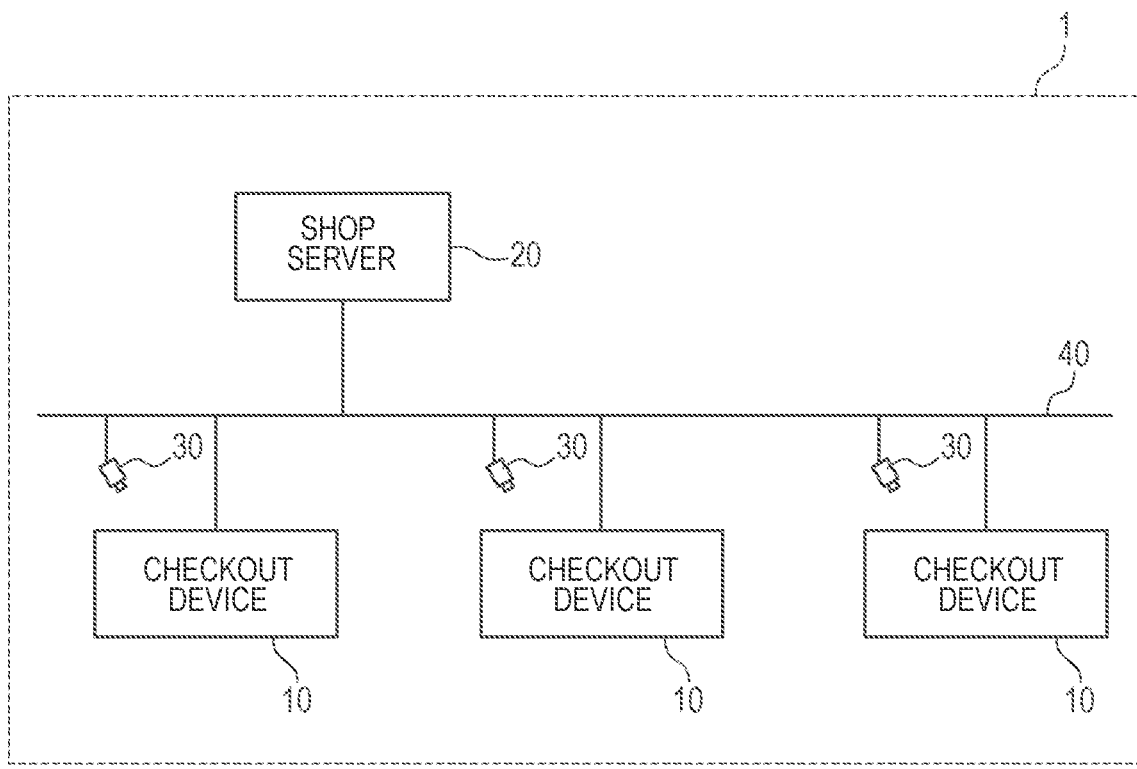
FIG. 1 is a schematic diagram illustrating a POS system using a checkout device according to a first example embodiment of the present invention.
Figure 3:
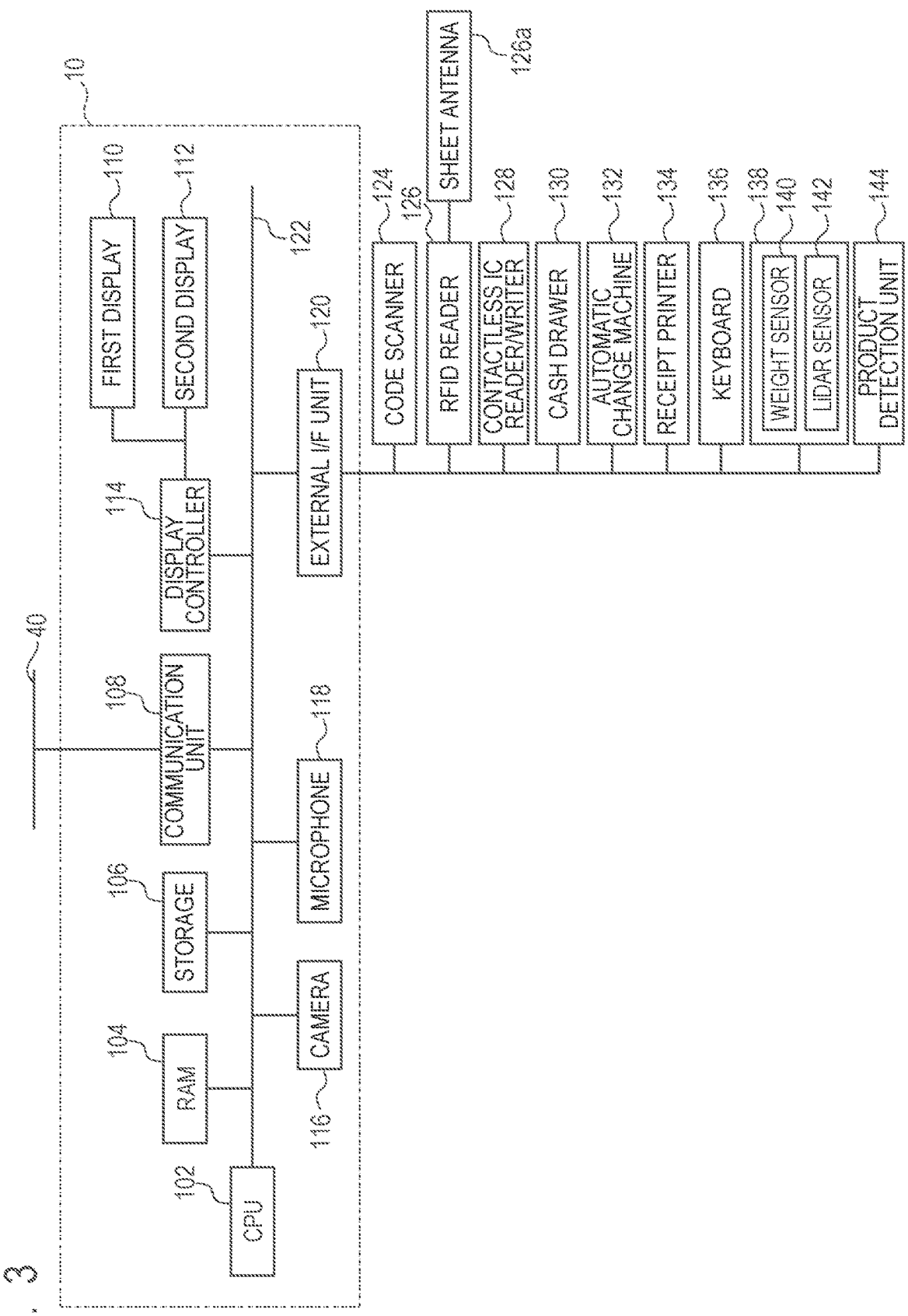
FIG. 3 is a block diagram illustrating a configuration of the checkout device according to the first example embodiment of the present invention.

First, the configuration of the checkout device according to the present example embodiment will be described with reference to FIG. 1 to FIG. 3. FIG. 1 is a schematic diagram illustrating a POS system using the checkout device according to the present example embodiment. FIG. 2 is a schematic diagram illustrating a configuration of the checkout device according to the present example embodiment. FIG. 3 is a block diagram illustrating a configuration of the checkout device according to the present example embodiment.

The checkout device according to the present example embodiment is used as a Point of Sales (POS) apparatus in a POS system introduced in a shop that sells products. As illustrated in FIG. 1, a POS system 2 is constructed and introduced in the shop 1. The POS system 2 includes a checkout device 10 according to the present example embodiment, a shop server 20, and a monitoring camera 30. The checkout device 10, the shop server 20, and the monitoring camera 30 are connected to a network 40 that is a Local Area Network (LAN), for example. Note that the number of checkout devices 10 to be installed is not limited, however, one or a plurality of checkout devices 10 may be installed in the shop 1 in accordance with the scale of the shop 1 or the like. Further, the number of monitoring cameras 30 to be installed is not limited either, however, the monitoring camera 30 may be installed for each checkout device 10, for example.

The checkout device 10 that functions as the POS apparatus is installed on a register counter 12 in the shop 1 as illustrated in FIG. 2. The shop 1 is not particularly limited and may be a shop of any kind of business types, for example, a convenience store, a clothing shop, a supermarket, or the like. Further, an installation place of the checkout device 10 is not necessarily required to be a place on the register counter 12 and may be various places in the shop 1.

In the checkout device 10, a POS application program having a product sales registration function, a checkout function, a product information registration function, an inventory management function, or the like is installed. As described later, the checkout device 10 is the POS apparatus that may switch the operation mode to the manned register mode that is a first mode or the self-service register mode that is a second mode. The manned register mode is a mode in which product registration of a product to be purchased by a customer is performed by a salesclerk and a checkout process for the product is performed by the operation of the salesclerk. The self-service register mode is a mode in which product registration of a product to be purchased by a customer is performed by the customer by himself/herself and a checkout process for the product is performed via the operation of the customer.

For example, the checkout device 10 is formed as a two-screen POS apparatus having a first display 110 and a second display 112. Each of the first display 110 and the second display 112 is formed of a touch panel display that can accept touch input on each screen to be displayed. The first display 110 and the second display 112 are provided so as to face different directions that are at least different from each other.

The first display 110 is arranged so as to face the inside of the register counter 12 where the salesclerk performs an operation and displays the screen to the salesclerk at the register counter 12. The first display 110 displays various windows such as an operation window or the like to the salesclerk and functions as an operator display that accepts touch input on the screen made by the salesclerk. That is, the first display 110 is provided so as to face the first direction that is a salesclerk side, displays a screen to the salesclerk, and functions as a first input/output unit that accepts input related to the checkout process or the like via touch input made by the salesclerk. The input related to the checkout process on the first display 110 is, for example, input by a salesclerk to start the checkout process in the manned register mode, input by a salesclerk to start checkout after completion of product registration, or the like.

The second display 112 is arranged so as to face the front of the register counter 12 where a customer going through the checkout process of a product is present and displays a screen to the customer side in front of the register counter 12. The second display 112 displays a checkout window, an advertisement window, or the like to the customer in the manned register mode, displays various windows such as an operation window or the like to the customer in the self-service register mode, and functions as a customer display that accepts touch input on the screen made by the customer. That is, the second display 112 is provided so as to face the second direction that is a customer side that is a different direction from the first direction, displays a screen to the customer, and functions as a second input/output unit that accepts input related to the checkout process or the like via touch input made by the customer. The input related to the checkout process on the second display 112 is, for example, input by a customer to start the checkout process in the self-service register mode, input by a customer to start checkout after completion of product registration, or the like.

As peripheral devices forming the POS apparatus, a code scanner 124, a Radio Frequency Identification (RFID) reader 126, a contactless Integrated Circuit (IC) reader/writer 128, a receipt printer 134, and the like described later, for example, are connected to the checkout device 10. On the register counter 12, the code scanner 124, a sheet antenna 126a of the RFID reader 126, the contactless IC reader/writer 128, and the receipt printer 134 are installed. For example, the receipt printer 134 is installed such that the direction to eject a receipt sheet to be printed can be changed manually or automatically in accordance with whether the operation mode of the checkout device 10 is the manned register mode or the self-service register mode. Further, the sheet antenna 126a may be installed in a stationary manner on the register counter 12 or may be installed by the salesclerk only in the case of the self-service register mode out of the manned register mode and the self-service register mode.

The shop server 20 is a POS server that manages product information on a product to be sold in the shop 1, collects sales data, manages sales proceeds, manages inventory, or the like and manages operation of the POS system 2, for example. For example, the shop server 20 is installed in a backyard or the like of the shop 1. The shop server 20 manages data of product information or the like used by the checkout device 10 used as the POS apparatus in a database or the like.

The monitoring camera 30 captures a moving image of the register counter 12 in which the checkout device 10 is installed and the surrounding area and acquires image information related to the captured area. The monitoring camera 30 may transmit the acquired image information to the checkout device 10 and the shop server 20 via the network 40. The monitoring camera 30 may store the captured and acquired image information in a local storage or a storage on a recording server for a certain period of time.

For example, the monitoring camera 30 may capture and monitor an action of the customer who is operating the checkout device 10 operating in the self-service register mode. In such a case, for example, the monitoring camera 30 may be configured to work in response to switching of the operation mode of the checkout device 10 described later and operate to capture and monitor the action of the customer only when the operation mode is the self-service register mode. Further, the monitoring camera 30 may operate regardless of which operation mode is applied in the checkout device 10 and capture and monitor the action of the salesclerk and the customer, for example.

FIG. 3 illustrates a hardware configuration example of the checkout device 10. Note that the hardware configuration of the checkout device 10 is not limited to the configuration illustrated in FIG. 3 and various configurations may be employed.

As illustrated in FIG. 2, the checkout device 10 is an information processing apparatus and has a central processing unit (CPU) 102, a random access memory (RAM) 104, and a storage 106. Further, the checkout device 10 has a communication unit 108, the first display 110, the second display 112, a display controller 114, a camera 116, a microphone 118, and an external interface (I/F) unit 120. The CPU 102, the RAM 104, the storage 106, the communication unit 108, the display controller 114, the camera 116, the microphone 118, and the external I/F unit 120 are connected to a bus line 122. Furthermore, the checkout device 10 has various peripheral devices and a sensor connected to the external I/F unit 120.

The external I/F unit 120 is connected to peripheral devices forming the POS apparatus, such as a code scanner 124, the RFID reader 126, the contactless IC reader/writer 128, a cash drawer 130, an automatic change machine 132, the receipt printer 134, a keyboard 136, and the like.

Further, the external I/F unit 120 is connected to a human detection unit 138 that detects a person around or near the register counter 12 that is an area around or near the checkout device 10. The human detection unit 138 is a sensor such as a weight sensor 140, a Light Detection and Ranging (LiDAR) sensor 142, or the like, for example. Note that the human detection unit 138 may include a single type of sensors or multiple types of sensors.

Further, the external I/F unit 120 is connected to a product detection unit 144 that detects a product on or above the register counter 12 that is an area around or near the checkout device 10. The product detection unit 144 is, for example, a sensor such as a weight sensor, a LiDAR sensor, or the like in the same manner as the human detection unit 138. Note that the product detection unit 144 may also include a single type of sensors or multiple types of sensors.

The CPU 102 operates by executing a program stored in the storage 106 and functions as a control unit that controls the overall operation of the checkout device 10. Further, the CPU 102 performs a POS application program stored in the storage 106 and performs various processes as the POS apparatus in the manned register mode or the self-service register mode. Accordingly, the CPU 102 functions as a checkout process unit or the like that processes checkout of the customer in the shop 1. The RAM 104 provides a memory area required for the operation of the CPU 102.

The CPU 102 functions as a control unit that switches the operation mode of the checkout device 10 as the POS apparatus to the self-service register mode or the manned register mode when a predetermined condition related to at least one of the status of the checkout device 10 and time is met. Specifically, when the operation mode is the manned register mode, the CPU 102 switches the operation mode from the manned register mode to the self-service register mode if the switching-to-self-service condition that is a first predetermined condition to switch the manned register mode to the self-service register mode is met. Further, when the operation mode is the self-service register mode, the CPU 102 switches the operation mode from the self-service register mode to the manned register mode if a switching-to-manned condition that is a second predetermined condition to switch the self-service register mode to the manned register mode is met. A switching-to-self-service condition and a switching-to-manned condition will be described later. Further, the CPU 102 may store operation mode information that is information related to the current operation mode in a storage area of the operation mode secured in the RAM 104, the storage 106, or the like, for example.

Furthermore, the CPU 102 selects, from the first display 110 and the second display 112, a touch panel display that is an input/output unit which accepts input related to the checkout process in accordance with switching of the operation mode. That is, the CPU 102 selects, from the first display 110 and the second display 112, the input/output unit which accepts input related to the checkout process based on at least one of the status of the checkout device 10 and time.

Further, the CPU 102 functions as a determination unit that determines whether or not the switching-to-self-service condition is met when the operation mode is the manned register mode and determines whether or not the switching-to-manned condition is met when the operation mode is the self-service register mode.

The storage 106 is formed of a storage medium such as a nonvolatile memory, a hard disk drive, or the like and functions as a storage unit. The storage 106 stores a program executed by the CPU 102, data referenced by the CPU 102 during execution of the program, or the like.

The communication unit 108 is connected to the network 40 and transmits and receives data to and from an external device such as the shop server 20, another checkout device 10, the monitoring camera 30, or the like via the network 40 under the control of the CPU 102.

The first display 110 is an operator display as a display unit for the salesclerk that displays information to the salesclerk. The first display 110 is a touch panel display that functions as a first input/output unit, functions as a display unit having a display screen, and functions as an input unit that accepts touch input made on the display screen. The display of the first display 110 is controlled by the CPU 102 that functions as a display control unit.

The first display 110 displays a window of the POS application program started up in the checkout device 10 and displays various information to the salesclerk. The salesclerk may operate the POS application program via touch input on the display screen of the first display 110.

The first display 110 displays an operation window for the salesclerk to perform the checkout process when the operation mode of the checkout device 10 is the manned register mode. The salesclerk may perform the checkout process for the checkout device 10 in the manned register mode via touch input on the first display 110, input on the keyboard 136, or the like. For example, the first display 110 may accept various types of input related to checkout process, such as input made by a salesclerk to start the checkout process in the manned register mode, input made by a salesclerk to start checkout after completion of product registration, or the like.

The second display 112 is a customer display as a display unit for the customer that displays information to the customer. The second display 112 is a touch panel display that functions as a second input/output unit, functions as a display unit having a display screen, and functions as an input unit that accepts touch input made on the display screen. The display of the second display 112 is controlled by the CPU 102 that functions as a display control unit.

The second display 112 displays various information on the display screen, such as checkout information, to the customer when the operation mode of the checkout device 10 is the manned register mode. The checkout information displayed on the second display 112 is, for example, a name of a product on which the checkout process is performed, a quantity of the product, a sales amount, a discount amount, a total amount, a tax amount, a received amount, a change amount, or the like. The second display 112 may also display information related to an advertisement, a promotion, an event, or the like to the customer.

Further, the second display 112 displays a guidance window and an operation window for performing the checkout process with the self-service register terminal to the customer when the operation mode of the checkout device 10 is the self-service register mode. The customer may perform the checkout process for the checkout device 10 in the self-service register mode via touch input on the operation window of the second display 112. For example, the second display 112 may accept various types of input related to the checkout process, such as input made by a customer to start the checkout process in the self-service register mode, input made by a customer to start checkout after completion of product registration, or the like.

Each of the first display 110 and the second display 112 is not particularly limited and may be formed of various displays. For example, the first display 110 and the second display 112 are each formed of a liquid crystal display, an Organic Light Emitting Diode (OLED) display, a Light Emitting Diode (LED) display, a Vacuum Fluorescent Display (VFD), or the like.

The display controller 114 controls display for the display screen of the first display 110 under the control of the CPU 102, monitors touch input made on the display screen of the first display 110, and acquires input data caused by touch input. Further, the display controller 114 controls display for the display screen of the second display 112 under the control of the CPU 102, monitors touch input made on the display screen of the second display 112, and acquires input data caused by touch input. The CPU 102 functions as a display control unit that controls the display of the first display 110 and the second display 112 via the display controller 114.

The camera 116 is installed so as to be able to capture a moving image or a static image of the customer present in front of the register counter 12. The camera 116 is, for example, a built-in camera built in the second display 112 facing the front of the register counter 12. Note that the camera 116 may also be an external camera connected to the checkout device 10 via the external I/F unit 120 or the like. The CPU 102 may perform an image recognition process on an image captured by the camera 116 and detect the presence or absence of the customer in front of the register counter 12. Note that the checkout device 10 may have a camera that can capture a moving image or a static image inside the register counter 12 at which the salesclerk performs operation in addition to the camera 116 or separately from the camera 116.

The microphone 118 is installed so as to be able to acquire an utterance of the customer present in front of the register counter 12. The microphone 118 is, for example, a built-in microphone built in the second display 112 facing the front of the register counter 12. Note that the microphone 118 may also be an external microphone connected to the checkout device 10 via the external I/F unit 120 or the like.

The checkout device 10 is configured to also function as an interaction apparatus by which the customer can perform a video interaction or a voice interaction by using the camera 116 and the microphone 118. The customer may perform the video interaction or the voice interaction with the salesclerk standing by in the backyard or the like or an operator or the like in a remote location by using the checkout device 10 that functions as the interaction apparatus, as described later. Accordingly, the customer may use the checkout device 10 that operates in the self-service register mode to perform the checkout process while receiving an explanation, an instruction, or the like from the salesclerk or the operator through the video interaction or the voice interaction, for example.

The external I/F unit 120 controls transmission and reception of data to and from the peripheral device forming the POS apparatus under the control of the CPU 102. Specifically, the external I/F unit 120 controls transmission and reception of data to and from the code scanner 124, the RFID reader 126, the contactless IC reader/writer 128, the cash drawer 130, the automatic change machine 132, the receipt printer 134, and the keyboard 136. The CPU 102 may control the code scanner 124, the RFID reader 126, the contactless IC reader/writer 128, the cash drawer 130, the automatic change machine 132, the receipt printer 134, and the keyboard 136 connected to the external I/F unit 120.

Further, the external I/F unit 120 controls transmission and receipt of data to and from the weight sensor 140, the LiDAR sensor 142, or the like of the human detection unit 138 under the control of the CPU 102. The CPU 102 may control the weight sensor 140, the LiDAR sensor 142, or the like of the human detection unit 138 connected to the external I/F unit 120.

Further, the external I/F unit 120 controls transmission and reception of data to and from the product detection unit 144 under the control of the CPU 102. The CPU 102 may control the product detection unit 144 connected to the external I/F unit 120.

The code scanner 124 operates under the control of the CPU 102 and functions as a reading unit that reads a code symbol provided to a product or the like on which checkout process is to be performed. The code symbol contains product information such as a product code, a business operator code, or the like. Note that price information on a product may be configured to be acquired by the checkout device 10 with reference to a database of the shop server 20 based on identification information such as a product code or the like contained in the code symbol or may be contained in the code symbol itself. The code symbol is not particularly limited and may be a one-dimensional code such as a bar code, a two-dimensional code such as a QR code (registered trademark), or the like, for example. The CPU 102 registers product information on a product read by the code scanner 124 as product information on the product to which the checkout process is to be performed. The code scanner 124 may be handy type one held by the salesclerk's hand or the customer's hand to read a code or stationary type one installed in a predetermined location.

The RFID reader 126 operates under the control of the CPU 102 and functions as a reading unit that reads an RFID tag attached to a product or the like on which the checkout process is to be performed. The RFID tag contains product information such as a product code, a business operator code, or the like. Note that price information on a product may be configured to be acquired by the checkout device 10 with reference to the database of the shop server 20 based on identification information such as the product code or the like contained in the RFID tag or may be contained in the RFID tag itself. Further, the RFID tag may contain expiration information related to a best before date or a use-by date described later and other information required for product management. The RFID reader 126 has the sheet antenna 126a installed on the register counter 12. For example, the RFID reader 126 reads the RFID tag attached to a product while the product is packed in a bag above the sheet antenna 126a by the salesclerk or the customer. The RFID reader 126 can collectively read RFID tags attached to a plurality of products and complete a reading process in a shorter time than the code scanner 124. The CPU 102 registers product information on a product read by the RFID reader 126 as product information on the product on which the checkout process is to be performed.

A product sold in the shop 1 may be attached with either one of a code symbol and an RFID tag or may be attached with both thereof. When the operation mode of the checkout device 10 is the manned register mode, the salesclerk may use the code scanner 124 or the RFID reader 126 to perform product registration by reading product information for a product purchased by the customer. Further, when the operation mode of the checkout device 10 is the self-service register mode, the customer may use the code scanner 124 or the RFID reader 126 to perform product registration by reading product information for a product purchased by the customer by himself/herself.

Note that, as a reading unit, not both of the code scanner 124 and the RFID reader 126, which are reading units configured to read product information in reading schemes different from each other, are necessarily required to be installed, and it is sufficient that either one of the code scanner 124 and the RFID reader 126 is installed. Further, as a reading unit, the reading unit is not limited to the code scanner 124 and the RFID reader 126 and may be a reading unit using another reading scheme. Furthermore, as a reading unit, a plurality of reading units configured to read product information in reading schemes different from each other may be installed.

Note that the CPU 102 may control the code scanner 124 and the RFID reader 126 so that product information can be read by either one of the code scanner 124 and the RFID reader 126 in accordance with the operation mode of the checkout device 10. In such a case, both the code symbol and the RFID tag are attached to a product sold in the shop 1.

Specifically, when the operation mode is the manned register mode, the CPU 102 controls the code scanner 124 and the RFID reader 126 so that product information can be read only by the code scanner 124 out of the code scanner 124 and the RFID reader 126. On the other hand, when the operation mode is the self-service register mode, the CPU 102 controls the code scanner 124 and the RFID reader 126 so that product information can be read only by the RFID reader 126 out of the code scanner 124 and the RFID reader 126. Control of the code scanner 124 and the RFID reader 126 in accordance with the operation mode of the checkout device 10 will be described in the second example embodiment.

Note that reading of product information by the code scanner 124 and reading of product information by the RFID reader 126 can also be configured so that the reading can be performed whether the operation mode is the manned register mode or the self-service register mode.

Further, the CPU 102 may also perform an image recognition process on an image captured by a camera that captures an image of an area above the register counter 12, detect a product from the image, and register product information on the detected product as product information on a product on which the checkout process is to be performed. The camera that captures an image of the area above the register counter 12 may be the monitoring camera 30, a camera installed on the checkout device 10, or a camera in a mobile terminal possessed by the salesclerk, for example. Product registration using an image recognition process may be performed instead of product registration using the code scanner 124 or the RFID reader 126 or in addition to at least either one of product registration using the code scanner 124 and the RFID reader 126.

The contactless IC reader/writer 128 operates under the control of the CPU 102 and acquires electronic money card information or credit card information for payment from a contactless IC chip of a device such as a smart phone of a customer or a medium such as a card of a customer.

The cash drawer 130 operates in accordance with the operation performed by the CPU 102 and opens a drawer for storing coins, bills, or the like in transaction of cash for cash payment. The cash drawer 130 is configured so that only the salesclerk can operate the cash drawer 130 in the manned register mode. That is, the cash drawer 130 is configured so that the customer is unable to operate the cash drawer 130 in the self-service register mode.

The automatic change machine 132 operates in accordance with the operation performed by the CPU 102 and automatically performs a cash receipt process of cash inserted in a cash receipt inlet for payment and cash dispense from a cash dispense outlet for changes that is to be paid back. For example, two automatic change machines 132 in total may be installed, one of which is used by the salesclerk in the manned register mode, and the other is used by the customer in the self-service register mode. Further, for example, a cash receipt inlet and a cash dispense outlet for the salesclerk and a cash receipt inlet and a cash dispense outlet for the customer may be provided in the single automatic change machine 132 so that the single automatic change machine 132 can be shared by the salesclerk and the customer. Furthermore, for example, only the single automatic change machine 132 used by the customer may be installed.

The receipt printer 134 operates under the control of the CPU 102 and prints out and outputs a paper receipt. The receipt printer 134 is configured such that the direction to eject a receipt sheet can be changed manually or automatically in accordance with the operation mode so that the receipt printer 134 can be used regardless of whether the operation mode of the checkout device 10 is the manned register mode or the self-service register mode.

The keyboard 136 is an input device that accepts input made by the salesclerk and is a programmable keyboard, for example. The salesclerk may perform input to the checkout device 10 via the keyboard 136 in addition to touch input on the first display 110.

Note that the checkout device 10 may be operated by connecting a peripheral device other than the code scanner 124 or the like described above if necessary. Further, the checkout device 10 is not necessarily required to have all the peripheral devices such as the code scanner 124 described above.

For example, when the checkout device 10 is configured as a terminal in which only electric money payment is available, the cash drawer 130 and the automatic change machine 132 are not required. In such a case, for example, when performing payment for a product, electronic money information is read from a customer's electronic money medium by the contactless IC reader/writer 128. With a configuration of the checkout device 10 as a terminal in which only electronic money payment is available, since a peripheral device for transaction of cash is not required, an installation space for the checkout device 10 that can operate in both the manned register mode and the self-service register mode may be further reduced.

Further, for example, when the checkout device 10 is configured to issue an electronic receipt instead of issuing a paper receipt, the receipt printer 134 is not required. For example, the checkout device 10 or the shop server 20 may transmit and issue the electronic receipt to a mail address associated with member information read from a customer's membership card or the like when performing the checkout process. Further, for example, the checkout device 10 or the shop server 20 may record the electronic receipt information in an account on the server associated with the member information read from the customer's membership card or the like when performing the checkout process. In such a case, for example, the customer may acquire the electronic receipt information by accessing the server by using an application in a mobile terminal.

For example, the human detection unit 138 corresponds to the weight sensor 140 and the LiDAR sensor 142, detects the presence or absence of a person around or near the checkout device 10, and outputs an output signal in accordance with the presence or absence of the person. Specifically, the human detection unit 138 detects the presence or absence of the salesclerk in the register counter 12 who is a person around or near the checkout device 10 and outputs an output signal in accordance with the presence or absence of the salesclerk. Further, the human detection unit 138 detects the presence or absence of the customer in front of the register counter 12 who is a person around or near the checkout device 10 and outputs an output signal in accordance with the presence or absence of the customer.

The weight sensor 140 detects the presence or absence of the salesclerk based on a change in weight on the floor in the register counter 12. Furthermore, the weight sensor 140 detects the presence or absence of the customer based on a change in weight on the floor in front of the register counter 12.

For example, the LiDAR sensor 142 is installed on the ceiling above the register counter 12. The LiDAR sensor 142 detects the presence or absence of the salesclerk based on a measurement result of scattered light from laser pulse emission from the area above the register counter 12 to the floor in the register counter 12. Further, the LiDAR sensor 142 detects the presence or absence of the customer based on a measurement result of scattered light from laser pulse emission from the area above the register counter 12 to the floor in front of the register counter 12.

The product detection unit 144 corresponds to a weight sensor and a LiDAR sensor, for example, in the same manner as the human detection unit 138. The product detection unit 144 detects the presence or absence of a product placed on the register counter 12 that is an area around or near the checkout device 10, that is, a product purchased by the customer and outputs an output signal in accordance with the presence or absence of the product.

In such a way, the checkout device 10 installed in the shop 1 is configured.

Figure 4A:
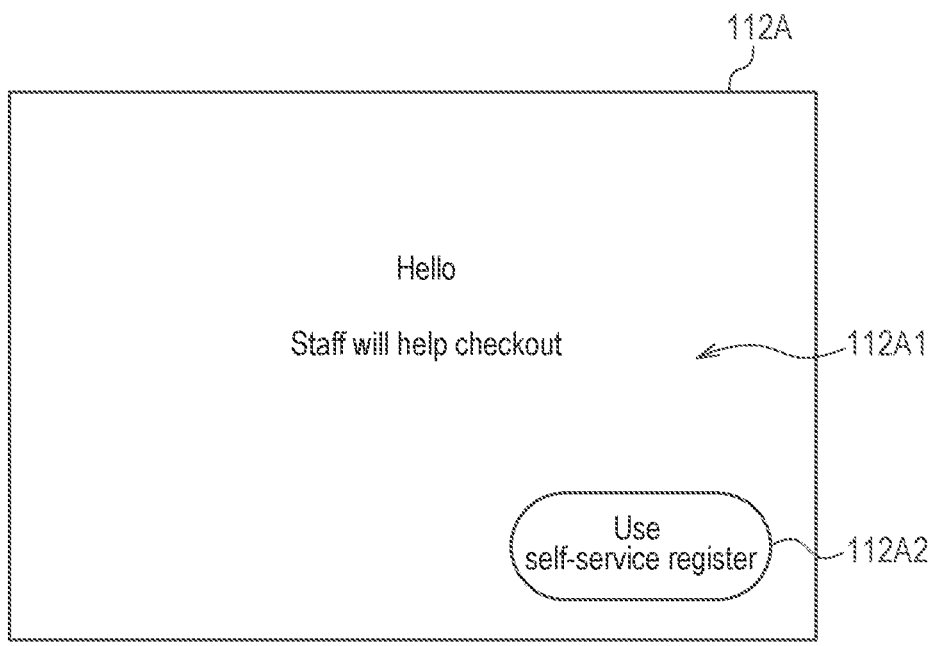
FIG. 4A is a schematic diagram illustrating an example of a display screen of a second display of the checkout device according to the first example embodiment of the present invention.
Figure 4B:
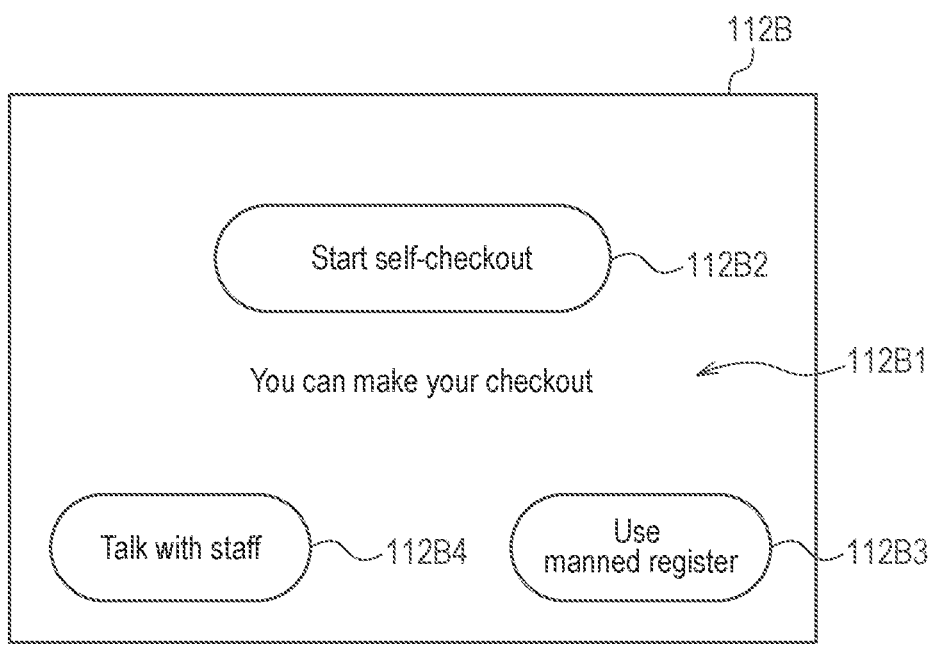
FIG. 4B is a schematic diagram illustrating an example of a display screen of a second display of the checkout device according to the first example embodiment of the present invention.
Figure 5:
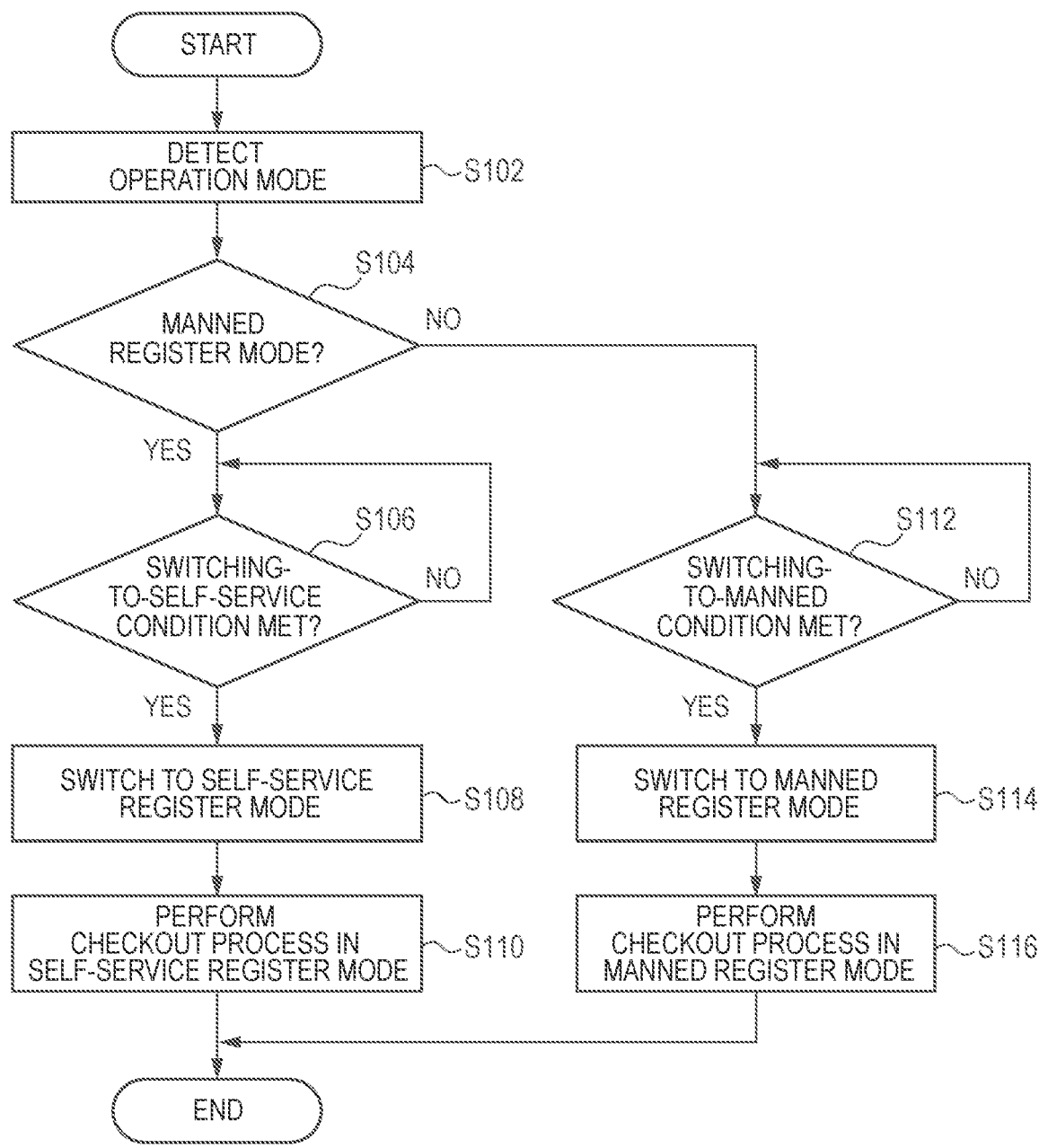
FIG. 5 is a flowchart illustrating an operation of switching an operation mode in the checkout device according to the first example embodiment of the present invention.

The checkout device 10 according to the present example embodiment is a POS apparatus that can operate in the operation mode of either the manned register mode or the self-service register mode and performs switching between the manned register mode and the self-service register mode when a predetermined condition is met. A switching operation of the operation mode in the checkout device 10 according to the present example embodiment and a control method that implements the operation will be further described with reference to FIG. 4A to FIG. 5 below. FIG. 4A and FIG. 4B are schematic diagrams illustrating examples of display screens of the second display 112 of the checkout device 10 according to the present example embodiment. FIG. 5 is a flowchart illustrating a switching operation of the operation mode in the checkout device 10 according to the present example embodiment.

The checkout device 10 operates in the operation mode of the manned register mode or the self-service register mode, and the checkout process for a product purchased by the customer can be performed in either of the operation modes. In the manned register mode, product registration for a product purchased by the customer is performed by the salesclerk. In the self-service register mode, product registration for a product purchased by the customer is performed by the customer by himself/herself. The CPU 102 may control a display screen of the second display 112 as described below in accordance with the operation mode of the checkout device 10.

FIG. 4A illustrates an example of a display screen 112A of the second display 112 of the checkout device 10 that operates in the manned register mode. In the manned register mode, a display screen 112A of the second display 112 displays operation mode display 112A1 indicating that the operation mode is the manned register mode, such as "Staff will help checkout", for example. The operation mode display 112A1 enables the customer who came to the register counter 12 to recognize that the checkout process is performed by a salesclerk operation in the manned register mode. In such a way, the operation mode display 112A1 of the second display 112 explicitly indicates the operation mode and provides a notification to the customer so that the customer may smoothly perform the checkout process without being confused. Note that the operation mode display 112A1 is not limited to the display illustrated in FIG. 4A and may be display that enables the customer to recognize that the checkout process is performed by a salesclerk operation in the manned register mode.

Further, the display screen 112A displays a switching button 112A2 used for touch input of a switching instruction that switches the operation mode from the manned register mode to the self-service register mode. For example, when the salesclerk is absent at the register counter 12, the customer may input a switching instruction to switch the operation mode from the manned register mode to the self-service register mode in the checkout device 10 by touching the switching button 112A2.

On the other hand, FIG. 4B illustrates an example of a display screen 112B of the second display 112 of the checkout device 10 that is operating in the self-service register mode. In the self-service register mode, a display screen 112B of the second display 112 displays operation mode display 112B1 that is display indicating that the operation mode is the self-service register mode, such as "You can make your checkout", for example. This operation mode display 112B1 enables the customer who came to the register counter 12 to recognize that he/she has to perform a checkout process by his/her operation in the self-service register mode. In such a way, the operation mode display 112B1 of the second display 112 explicitly indicates the operation mode to the customer and provides a notification to the customer so that the customer may smoothly perform the checkout process without being confused. Note that the operation mode display 112B1 is not limited to the display illustrated in FIG. 4B and may be the display by which the customer may recognize that he/she has to perform a checkout process by his/her operation in the self-service register mode.

Further, the display screen 112B displays a start button 112B2 used for touch input of a start instruction to start the checkout process in the self-service register mode. For example, the start button 112B2 is provided with display such as "Start self-checkout". The customer may start the checkout process using the checkout device 10 that is operating in the self-service register mode by touching the start button 112B2. The second display 112 in the self-service register mode displays a guidance window that explains, to the customer, a series of operation methods from reading of a product to payment of a product price. Note that the start button 112B2 may also serve as the operation mode display 112B1.

Further, the display screen 112B displays a switching button 112B3 used for touch input of a switching instruction to switch the operation mode from the self-service register mode to the manned register mode. The customer who does not wish the checkout process in the self-service register mode may input a switching instruction to switch the operation mode from the self-service register mode to the manned register mode in the checkout device 10 by touching the switching button 112B3. When the switching button 112B3 is touched, the CPU 102 transmits a notification to call a salesclerk to a terminal possessed by the salesclerk or a terminal installed in a backyard or the like where the salesclerk is standing by, for example, via the network 40.

Further, the display screen 112B displays an interaction button 112B4 to provide an instruction to perform an interaction with the salesclerk standing by in a backyard or the like or the operator in a remote location. The customer may perform a video interaction by an image and voice using the camera 116 and the microphone 118 or a voice interaction by voice using the microphone 118 with the salesclerk or the operator by touching the interaction button 112B4. Accordingly, the customer may inquire of the salesclerk or the operator about an unclear point or the like even when the salesclerk is absent at the register counter 12. Further, the customer may go through the checkout process in the checkout device 10 that operates in the self-service register mode while receiving an explanation from the salesclerk or the operator via a video interaction or a voice interaction with the salesclerk or the operator.

As illustrated in FIG. 5, the CPU 102 of the checkout device 10 detects the operation mode of the checkout device 10 (step S102). The CPU 102 can detect the operation mode by referencing operation mode information that is information on the operation mode. The operation mode setting information is stored in the operation mode storage area such as the RAM 104, the storage 106, or the like, for example.

Next, the CPU 102 determines whether or not the operation mode is a manned register mode based on the detection result of the operation mode (step S104).

If the CPU 102 determines that the operation mode is the manned register mode (step S104, YES), the CPU 102 determines whether or not the switching-to-self-service condition is met (step S106) and stands by until the switching-to-self-service condition is met (step S106, NO). The switching-to-self-service condition is a condition to switch the operation mode from the manned register mode to the self-service register mode, which is a condition related to a salesclerk or a customer that is a person, a condition related to time, or the like. The switching-to-self-service condition is a condition related to the status or the like of the checkout device 10 of interest, such as whether or not a salesclerk is present around the checkout device 10 of interest, whether or not a customer is present around the checkout device 10 of interest, whether or not a product is present around the checkout device 10 of interest, or the like, for example.

If the CPU 102 determines that the switching-to-self-service condition is met (step S106, YES), the CPU 102 switches the operation mode from the manned register mode to the self-service register mode (step S108). The CPU 102 may switch the operation mode from the manned register mode to the self-service register mode if any of various switching-to-self-service conditions is met as described below. Note that the CPU 102 may determine whether or not only one of the plurality of switching-to-self-service conditions described below is met or may determine whether or not all or some of the plurality of switching-to-self-service conditions are met, respectively.

For example, the CPU 102 switches the operation mode from the manned register mode to the self-service register mode when a switching instruction for switching from the manned register mode to the self-service register mode is input to the checkout device 10 by a salesclerk as the case where the switching-to-self-service condition is met. The salesclerk may input a switching instruction for switching to the self-service register mode to the checkout device 10 by using touch input on the first display 110, key input on the keyboard 136, or the like, for example. Further, the salesclerk may input a switching instruction for switching to the self-service register mode to the checkout device 10 by pressing a separately provided physical button (not illustrated), for example. Further, the salesclerk may input a switching instruction for switching to the self-service register mode to the checkout device 10 by voice input via the microphone 118, for example. In such a case, the CPU 102 can detect the switching instruction for switching to the self-service register mode by performing a voice recognition process on voice input from the salesclerk via the microphone 118.

Further, for example, the CPU 102 switches the operation mode from the manned register mode to the self-service register mode when the switching instruction for switching from the manned register mode to the self-service register mode is input to the checkout device 10 by a customer as the case where the switching-to-self-service condition is met. The customer may input a switching instruction for switching to the self-service register mode to the checkout device 10 by touching a switching button 112A2 displayed on the display screen 112A of the second display 112 as described above, for example. Further, the customer may input a switching instruction for switching to the self-service register mode to the checkout device 10 by pressing a separately provided physical button (not illustrated), for example. Further, the customer may input a switching instruction for switching to the self-service register mode to the checkout device 10 by voice input via the microphone 118, for example. In such a case, the CPU 102 can detect the switching instruction for switching to the self-service register mode by performing a voice recognition process on voice input from the customer via the microphone 118.

Further, for example, the CPU 102 can switch the operation mode from the manned register mode to the self-service register mode based on preset time. Specifically, the CPU 102 automatically switches the operation mode from the manned register mode to the self-service register mode when a switching schedule to switch the operation mode from the manned register mode to the self-service register mode arrives as the case where the switching-to-self-service condition is met, for example. The switching schedule can be set by specifying time of the day, specifying a day of the week and time of the day, specifying a date, or specifying a date and time of the day, for example. The salesclerk may set a switching schedule in the checkout device 10 in advance. For example, the salesclerk may set in advance the time such as midnight when the number of working salesclerks is less than a certain number, which is one of the status of the checkout device 10, as the switching schedule to switch the operation mode from the manned register mode to the self-service register mode.

Further, the CPU 102 can link the switching schedule to a salesclerk shift table to automatically set the switching schedule. In such a case, based on the shift table, the CPU 102 can set the time such as midnight when the number of working salesclerks is less than a certain number or the time when a salesclerk is absent, for example, as the switching schedule to switch the operation mode from the manned register mode to the self-service register mode.

Further, for example, the CPU 102 can switch the operation mode from the manned register mode to the self-service register mode based on a detection result for the presence or absence of a salesclerk and a customer that are persons around or near the checkout device 10 detected by the human detection unit 138. Herein, the salesclerk around or near the checkout device 10 to be detected is a salesclerk who may perform product registration in a manned register mode at the register counter 12. The customer around or near the checkout device 10 to be detected is a customer who wishes to purchase a product at the register counter 12. Specifically, the CPU 102 automatically switches the operation mode from the manned register mode to the self-service register mode when the absence of the salesclerk is detected and the presence of a customer is detected by the human detection unit 138 as the case where the switching-to-self-service condition is met, for example.

Further, for example, the CPU 102 can switch the operation mode from the manned register mode to the self-service register mode based on a detection result for the presence or absence of a salesclerk around or near the checkout device 10 detected by the human detection unit 138 and for the presence or absence of a product detected by the product detection unit 144. Herein, the salesclerk around or near the checkout device 10 to be detected is a salesclerk who may perform product registration in a manned register mode at the register counter 12. The product to be detected is a product placed on the register counter 12. Specifically, the CPU 102 automatically switches the operation mode from the manned register mode to the self-service register mode when the absence of the salesclerk is detected by the human detection unit 138 and the presence of a product is detected by the product detection unit 144 as the case where the switching-to-self-service condition is met, for example.

Note that the CPU 102 can also automatically switches the operation mode from the manned register mode to the self-service register mode uniformly when the absence of the salesclerk is detected by the human detection unit 138 regardless of the presence or absence of a customer or the presence or absence of a product, for example.

Further, the CPU 102 can detect the presence or absence of a salesclerk and a customer around or near the checkout device 10 by performing an image recognition process on an image from the monitoring camera 30 or the camera 116. The CPU 102 can use the detection result in accordance with such image recognition processes instead of the detection result in accordance with the human detection unit 138 described above. The CPU 102 can detect the presence or absence of a salesclerk and a customer while accurately distinguishing a salesclerk and a customer from each other by detecting the face of the salesclerk, the uniform of the salesclerk, or the like registered in advance, for example, in the image recognition process.

Further, the CPU 102 can detect the presence or absence of a product on the register counter 12 by performing an image recognition process on an image from the monitoring camera 30. The CPU 102 can use the detection result from such an image recognition process instead of the detection result from the product detection unit 144 described above.

Further, the CPU 102 can perform face detection on an image captured by the monitoring camera 30 or the camera 116 that captures an image in front of the register counter 12 to perform face authentication related to a customer based on the detected face image. In such a case, the CPU 102 matches, at 1:N, the detected face image, which is a face image detected, with a plurality of registered customer face images, which are face images of a plurality of customers registered in advance in a customer database or the like. Matching of face images can be performed by using feature amounts of the face images, and the feature amounts of face images of customers may be registered instead of the registered customer face images. If the detected face image matches a registered customer face image as a result of matching, the CPU 102 may store purchase information including product information related to a product purchased by the customer in a customer database or the like as a log indicating a purchase history of the customer. The purchase information may include information on a purchase date and time, a purchase price, a purchase quantity, a payment method, or the like, for example, in addition to the product information.

Furthermore, the CPU 102 can detect suspicious behavior of a customer, such as shoplifting, by using image analysis to perform detection of a suspicious or unnatural behavior pattern, face detection on a particular person, differential detection for a display shelf, or the like, for example, on an image captured by the monitoring camera 30 or the camera 116. When suspicious behavior of a customer, such as shoplifting, is detected, the CPU 102 may store a detected face image in association with a series of behavior even when the detected face image does not match a registered customer face image.

The CPU 102 can perform matching between a detected face image with registered customer face images and storage of product information based on a matching result described above regardless of whether the operation mode is the self-service register mode or the manned register mode.

Further, the CPU 102 switches the operation mode to the self-service register mode as described above and selects the second display 112 out of the first display 110 and the second display 112 as an input/output unit that accepts input related to a checkout process. Note that the CPU 102 may select the second display 112 at the same time as the switching of the operation mode to the self-service register mode or may select the second display 112 before or after the switching of the operation mode to the self-service register mode. In such a way, the CPU 102 selects an input/output unit that accept input related to a checkout process from the first display 110 and the second display 112 based on at least one of the status of the checkout device 10 and time.

The checkout device 10 whose operation mode has been switched from the manned register mode to the self-service register mode as described above performs a checkout process of a product purchased by the customer in the self-service register mode (step S110).

On the other hand, if the CPU 102 determines that the operation mode is the self-service register mode (step S104, NO), the CPU 102 determines whether or not the switching-to-manned condition is met (step S112) and stands by until the switching-to-manned condition is met (step S112, NO). The switching-to-manned condition is a condition to switch the operation mode from the self-service register mode to the manned register mode, which is a condition related to a salesclerk or a customer that is a person, a condition related to time, or the like. For example, the switching-to-manned condition is a condition related to the status of the checkout device 10 of interest, such as whether or not a salesclerk is present around the checkout device 10 of interest, whether or not a customer is present around the checkout device 10 of interest, whether or not a product is present around the checkout device 10 of interest, or the like.

If the CPU 102 determines that the switching-to-manned condition is met (step S112, YES), the CPU 102 switches the operation mode from the self-service register mode to the manned register mode (step S114). The CPU 102 may switch the operation mode from the self-service register mode to the manned register mode if any of various switching-to-manned conditions is met as described below. Note that the CPU 102 may determine whether or not only any one of the plurality of switching-to-manned conditions described below is met or may determine whether or not all or some of the plurality of switching-to-manned conditions are met, respectively.

For example, the CPU 102 switches the operation mode from the self-service register mode to the manned register mode when a switching instruction for switching from the self-service register mode to the manned register mode is input to the checkout device 10 by a salesclerk as the case where the switching-to-manned condition is met. The salesclerk may input a switching instruction for switching to the manned register mode to the checkout device 10 by using touch input on the first display 110, key input on the keyboard 136, or the like, for example. Further, the salesclerk may input a switching instruction for switching to the manned register mode to the checkout device 10 by pressing a separately provided physical button (not illustrated), for example. Further, the salesclerk may input a switching instruction for switching to the manned register mode to the checkout device 10 by voice input via the microphone 118, for example. In such a case, the CPU 102 can detect the switching instruction for switching to the manned register mode by performing a voice recognition process on voice input from the salesclerk via the microphone 118.

Further, for example, the CPU 102 switches the operation mode from the self-service register mode to the manned register mode when the switching instruction for switching from the self-service register mode to the manned register mode is input to the checkout device 10 by a customer as the case where the switching-to-manned condition is met. The customer may input a switching instruction for switching to the manned register mode to the checkout device 10 by touching a switching button 112B3 displayed on the display screen 112B of the second display 112 as described above, for example. Further, the customer may input a switching instruction for switching to the manned register mode to the checkout device 10 by pressing a separately provided physical button (not illustrated), for example. Further, the customer may input a switching instruction for switching to the manned register mode to the checkout device 10 by voice input via the microphone 118, for example. In such a case, the CPU 102 can detect the switching instruction for switching to the manned register mode by performing a voice recognition process on voice input from the customer via the microphone 118.

Note that, when a switching instruction for switching from the self-service register mode to the manned register mode is input by a customer, the CPU 102 performs a process of calling a salesclerk for a checkout process in the manned register mode. The CPU 102 can transmit a notification to call a salesclerk to a terminal possessed by a salesclerk or a terminal installed in a backyard or the like where a salesclerk stands by via the network 40, for example, as a process of calling a salesclerk. Further the CPU 102 may sound a call tone to call a salesclerk, for example, as the process of calling a salesclerk. Note that, when determining that the checkout process in the manned register mode is unable to be performed, the CPU 102 notifies the customer that the checkout process in the manned register mode is unable to be performed by using display on the second display 112 or the like. For example, the CPU 102 may determine that the checkout process in the manned register mode is unable to be performed when there is no response from the salesclerk to a notification to call a salesclerk, when a salesclerk operation in the manned register mode is not started even after a certain period of time has passed, or the like.

Further, for example, the CPU 102 can switch the operation mode from the self-service register mode to the manned register mode based on preset time. Specifically, the CPU 102 automatically switches the operation mode from the self-service register mode to the manned register mode when a switching schedule to switch the operation mode from the self-service register mode to the manned register mode arrives as the case where the switching-to-manned condition is met, for example. The switching schedule can be set by specifying time of the day, specifying a day of the week and time of the day, specifying a date, or specifying a date and time of the day, for example. The salesclerk may set a switching schedule in the checkout device 10 in advance. For example, the salesclerk sets in advance the time when the number of working salesclerks is greater than or equal to a certain number, which is one of the status of the checkout device 10, as the switching schedule to switch the operation mode from the self-service register mode to the manned register mode.

Further, the CPU 102 can link the switching schedule to the shift table of salesclerks to automatically set the switching schedule. In such a case, the CPU 102 can set in advance the time when the number of working salesclerks is greater than or equal to a certain number as a switching schedule to switch the operation mode from the self-service register mode to the manned register mode.

Further, for example, the CPU 102 can switch the operation mode from the self-service register mode to the manned register mode based on a detection result of the presence or absence of a salesclerk around or near the checkout device 10 detected by the human detection unit 138. Herein, the salesclerk around or near the checkout device 10 to be detected is a salesclerk who may perform production registration at a manned register mode in the register counter 12. Specifically, the CPU 102 automatically switches the operation mode from the self-service register mode to the manned register mode when the presence of a salesclerk is detected by the human detection unit 138, for example, as the case where the switching-to-manned condition is met.

Note that the CPU 102 can perform an image recognition process on an image captured by the monitoring camera 30 and detect the presence or absence of a salesclerk around or near the checkout device 10. The CPU 102 can use the detection result from such an image recognition process instead of the detection result from the human detection unit 138 described above.

Further, the CPU 102 can perform face detection on an image captured by the monitoring camera 30 or a camera provided to the checkout device 10 that captures an image inside the register counter 12 and perform face recognition related to a salesclerk based on the detected face image. In such a case, the CPU 102 matches a detected face image, which is the face image detected, with one or more registered salesclerk face images, which are face images of salesclerks registered in advance in a shop database or the like. The matching of face images is 1:N matching in a case of a plurality of salesclerks, and the face matching is 1:1 matching in a case of a single salesclerk. The matching of face images can be performed by using feature amounts of face images, and the feature amounts of face images of salesclerks may be registered instead of the registered salesclerk face images. If the detected face image matches a registered salesclerk face image as a result of the matching, the CPU 102 may switch the operation mode from the self-service register mode to the manned register mode as a salesclerk being present inside the register counter 12.

On the other hand, if the detected face image does not match a registered salesclerk face image as a result of the matching, the CPU 102 may maintain the self-service register mode as the operation mode. In such a case, since a person other than a salesclerk is likely to be present inside the register counter 12, the CPU 102 may transmit an alert indicating that a person other than a salesclerk is likely to be present inside the register counter 12 to a predetermined terminal via the network 40. The terminal to which the alert is transmitted is, for example, a terminal possessed by a salesclerk performing his/her operation at a place other than the register counter 12, a terminal installed in a backyard or the like where a salesclerk stands by, or the like.

Further, the CPU 102 switches the operation mode to the manned register mode as described above and selects the first display 110 out of the first display 110 and the second display 112 as the input/output unit that accepts input related to a checkout process. Note that the CPU 102 may select the first display 110 at the same time as the switching of the operation mode to the manned register mode or may select the first display 110 before or after the switching of the operation mode to the manned register mode. In such a way, the CPU 102 selects, from the first display 110 and the second display 112, the input/output unit that accepts input related to a checkout process based on at least one of the status of the checkout device 10 of interest and time.

The checkout device 10 in which the operation mode has been switched from the self-service register mode to the manned register mode as described above performs a checkout process for the product purchased by the customer in a manned register mode (step S116).

As described above, the CPU 102 of the checkout device 10 switches the operation mode to the manned register mode or the self-service register mode in accordance with the status. The CPU 102 repeats the switching operation of the operation mode illustrated in FIG. 5 described above while the checkout device 10 is operating.

Note that the checkout device 10 may employ a configuration in which the automatic change machine 132 is provided at a position that enables the salesclerk's operation and the contactless IC reader/writer 128 is provided at a position that enables the customer's operation. In such a case, the CPU 102 can be configured to control the automatic change machine 132 and the contactless IC reader/writer 128 in accordance with switching of the operation mode to the manned register mode or the self-service register mode.

For example, in a case of the manned register mode, the CPU 102 performs control to enable the use of the automatic change machine 132 and the contactless IC reader/writer 128. Then, when the manned register mode is switched to the self-service register mode, the CPU 102 performs control to restrict the use of the automatic change machine 132 and enable only the use of the contactless IC reader/writer 128. Accordingly, in a case of self-service register mode, it is possible to prevent the use of the automatic change machine 132 and thus improve security.

In such a way, according to the present example embodiment, the operation mode of the checkout device 10 is switched to the self-service register mode or the manned register mode suitably in accordance with the status. Further, according to the present example embodiment, the input/output unit that accepts input related to a checkout process is selected from the first display 110 and the second display 112 suitably in accordance with the status. Therefore, according to the present example embodiment, a checkout process for a customer can be smoothly performed in accordance with the status.

According to the present example embodiment, since it is possible to perform a checkout process by using the checkout device 10 operating in a self-service register mode without having a customer kept waiting in the absence of a salesclerk, for example, it is possible to improve customer satisfaction of customers who use the shop 1. Further, according to the present example embodiment, it is possible to perform a checkout process by using the checkout device 10 operating in the self-service register mode during a time range such as midnight or a season such as yearend and new year holidays for which it is difficult to ensure a salesclerk (s), for example. Therefore, according to the present example embodiment, it is possible to open and operate the shop 1 even in a time range or a season for which it is difficult to ensure a salesclerk(s) and it is thus possible to expect improvement of sales proceeds of the shop 1. Further, according to the present example embodiment, by causing the checkout device 10 to operate in the self-service register mode that requires no salesclerk where appropriate, it is possible to run the shop 1 with fewer salesclerks, and it is possible to reduce personnel cost required for running the shop 1.

Further, according to the present example embodiment, since it is possible to cause a single checkout device 10 to operate in both the operation modes of the manned register mode and the self-service register mode, it is not required to separately secure the installation space of the checkout device used for a self-service register in the shop 1. Therefore, according to the present example embodiment, a checkout process with a manned register and a self-service register can be implemented even in a limited space in a shop. In particular, a checkout process with a manned register and a self-service register can be implemented even in a shop having a limited space as with a shop such as a convenience store in an urban area, inside a station premises, or the like.

Second Example Embodiment

A checkout device and a control method of the checkout device according to a second example embodiment of the present invention will be described with reference to FIG. 6. Note that the same components as those of the checkout device and the control method of the checkout device according to the first example embodiment described above are labeled with the same references, and the description thereof will be omitted or simplified.

The configuration of the POS system 2 and the checkout device 10 according to the present example embodiment is the same as that of the POS system 2 and the checkout device 10 according to the first example embodiment. In the present example embodiment, an operation of switching the code scanner 124 and the RFID reader 126 in accordance with the operation mode of the checkout device 10 and a control method of realizing the operation will be described with reference to FIG. 6. FIG. 6 is a flowchart illustrating an operation of switching the reading unit in the checkout device 10 according to the present example embodiment. Note that, in the present example embodiment, both a code symbol and an RFID tag are attached to a product sold in the shop 1.

Figure 6:
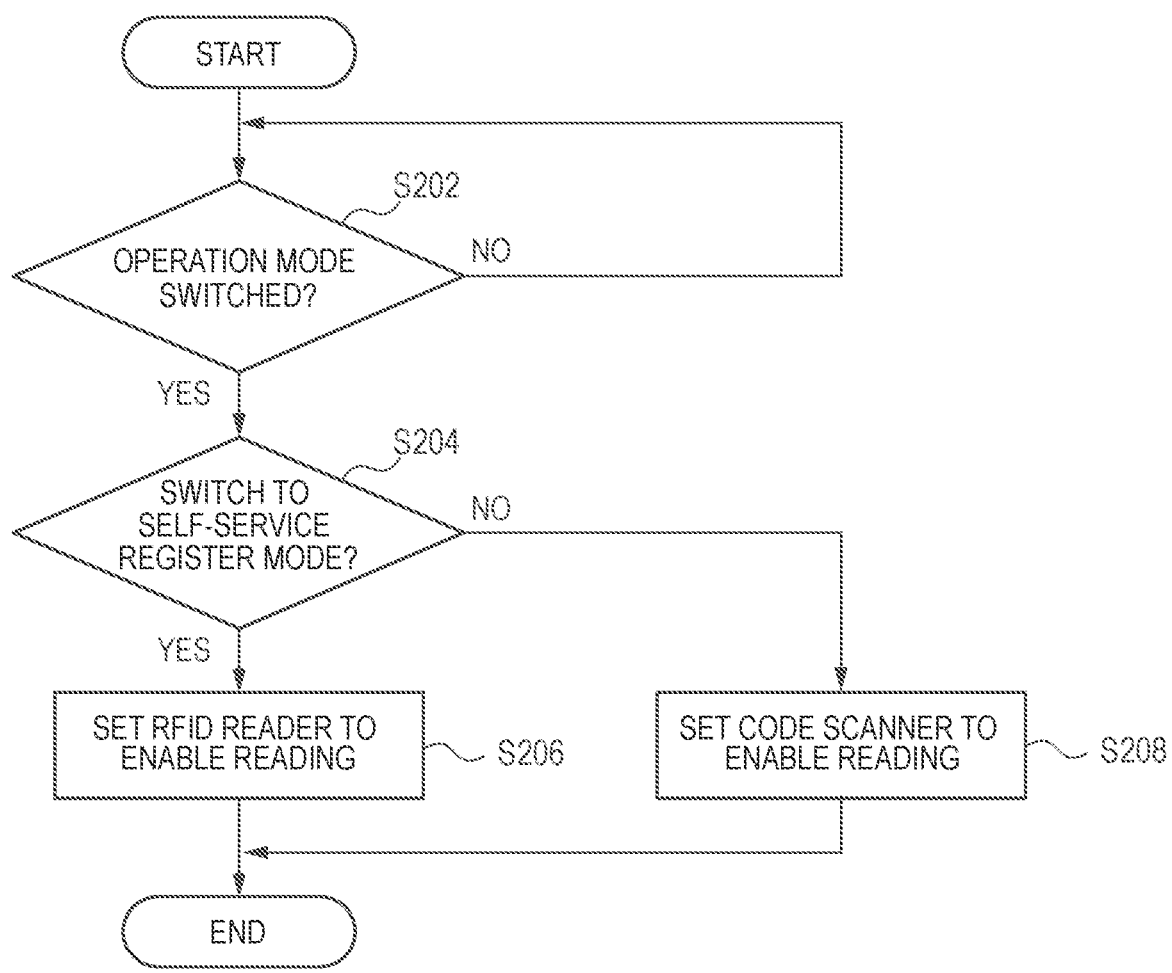
FIG. 6 is a flowchart illustrating an operation of switching a reading unit in a checkout device according to a second example embodiment of the present invention.

As illustrated in FIG. 6, the CPU 102 of the checkout device 10 determines whether or not switching of the operation mode of the checkout device 10 has been performed as with the first example embodiment (step S202) and stands by for switching of the operation mode being performed (step S202, NO).

If the CPU 102 determines that switching of the operation mode has been performed (step S202, YES), the CPU 102 determines whether or not the switching of the operation mode is switching from the manned register mode to the self-service register mode (step S204). The CPU 102 functions as the reading control unit that controls the code scanner 124 and the RFID reader 126 as below based on the determination result of switching of the operation mode.

If the CPU 102 determines that the switching of the operation mode is switching from the manned register mode to the self-service register mode (step S204, YES), the CPU 102 as the reading control unit operates only the RFID reader 126 so as to be able to read product information (step S206). That is, the CPU 102 controls the code scanner 124 and the RFID reader 126 and sets and operate only the RFID reader 126 out of the code scanner 124 and the RFID reader 126 to be able to read product information. In such a case, the CPU 102 can set the code scanner 124 to be unable to read product information by stopping the operation of the code scanner 124 or causing the code scanner 124 to enter an inactive state, for example.

In such a way, the customer can get the product information on a product to purchase read and registered by using the RFID reader 126 that operates so as to be able to read product information when the checkout device 10 operates in the self-service register mode. Since the customer can cause the RFID reader 126 to read product information on a product by simply placing the product on the sheet antenna 126a of the RFID reader 126, it is possible to perform reading of product information smoothly in a short time.

Note that not all the products sold in the shop 1 is required to be attached with the RFID tag. For example, no RFID tag may be attached to a specified product for which a confirmation procedure such as age verification performed by a salesclerk is required in the sales described later. Accordingly, the specified product with no RFID tag attached can be handled as a product that can be sold only in the manned register mode.

On the other hand, the CPU 102 determines that the switching of the operation mode is switching from the self-service register mode to the manned register mode (step S204, NO), the CPU 102 as the reading control unit operates only the code scanner 124 so as to be able to read product information (step S208). That is, the CPU 102 controls the code scanner 124 and the RFID reader 126 and sets and operates only the code scanner 124 out of the code scanner 124 and the RFID reader 126 to be able to read product information. In such a case, the CPU 102 can set the RFID reader 126 to be unable to read product information by stopping the operation of the RFID reader 126 or causing the RFID reader 126 to enter an inactive state, for example. Further, for example, the CPU 102 can set the RFID reader 126 to be unable to read product information by stopping the output of the radio wave from the sheet antenna 126a of the RFID reader 126.

In such a way, the salesclerk can get the product information on the product, which is purchased by a customer, read and registered by using the code scanner 124 that operates so as to be able to read product information when the checkout device 10 operates in the self-service register mode. The salesclerk takes a product purchased by the customer in hand to perform reading of product information by using the code scanner 124 on a product basis and thus is able to reliably confirm the selling product. Accordingly, for example, it is possible to more reliably prevent sales such as sales of a defective product, sales of a food whose use-by date or best-before date has passed, or the like.

As described above, the CPU 102 of the checkout device 10 operates either one of the code scanner 124 and the RFID reader 126, which are reading units, so as to be able to read product information in accordance with the operation mode. The checkout device 10 repeats the switching operation of the reading unit illustrated in FIG. 6 described above during the operation.

In such a way, according to the present example embodiment, since the reading unit that is able to read product information is switched between the code scanner 124 and the RFID reader 126 in accordance with the operation mode of the checkout device 10, a more suitable reading unit can be selected in accordance with the operation mode. Therefore, according to the present example embodiment, it is possible to smoothly perform a checkout process on a customer in accordance with the status.

Note that, although the case where either one of the code scanner 124 and the RFID reader 126 is operated so as to be able to read product information in accordance with the operation mode of the checkout device 10 has been described above, the example embodiment is not limited thereto.

For example, the CPU 102 may operate both the code scanner 124 and the RFID reader 126 so as to be able to read product information in a manned register mode and, on the other hand, may operate only the RFID reader 126 so as to be able to read product information in the self-service register mode. With such a configuration, it is possible to efficiently read and register product information by using the RFID reader 126 in both the manned register mode and the self-service register mode.

Third Example Embodiment

Figure 7:
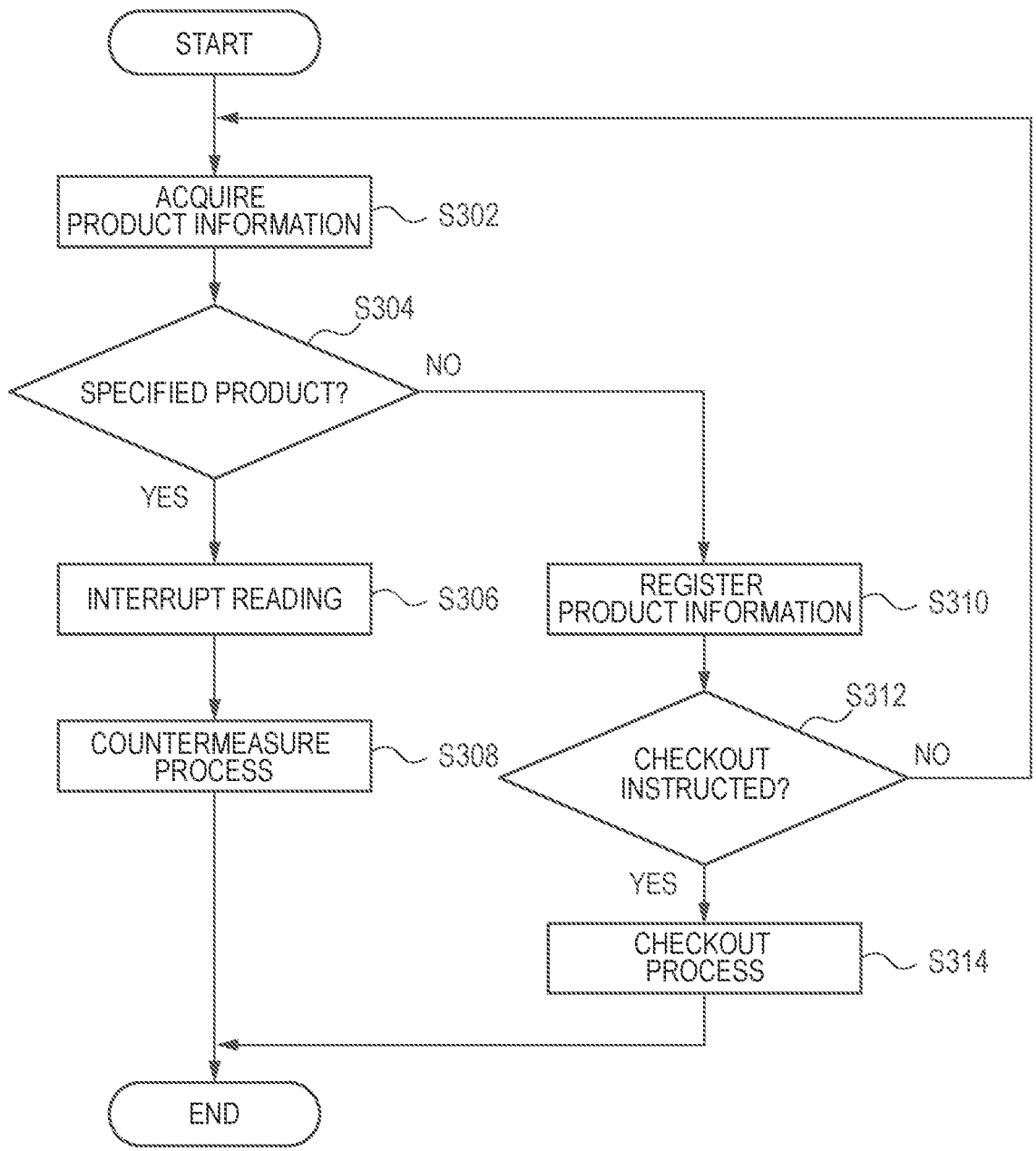
FIG. 7 is a flowchart illustrating an interruption operation in a self-service register mode of a checkout device according to a third example embodiment of the present invention.

A checkout device and a control method of the checkout device according to a third example embodiment of the present invention will be described with reference to FIG. 7. Note that the same components as those of the checkout device and the control method of the checkout device according to the first and second example embodiments described above are labeled with the same references, and the description thereof will be omitted or simplified.

The configuration of the POS system 2 and the checkout device 10 according to the present example embodiment is the same as that of the POS system 2 and the checkout device 10 according to the first and second example embodiments. In the present example embodiment, an interruption operation when product information on a specified product requiring a confirmation procedure or the like performed by a salesclerk has been read and a control method of realizing the interruption operation in the self-service register mode of the checkout device 10 will be described with reference to FIG. 7. FIG. 7 is a flowchart illustrating an interruption operation in the self-service register mode of the checkout device 10 according to the present example embodiment.

The CPU 102 of the checkout device 10 operating in the self-service register mode acquires product information on a product read by the code scanner 124 or the RFID reader 126 (step S302). The CPU 102 can also acquire more detailed product information by referencing the database of the shop server 20 based on identification information such as a product code included in the product information read by the code scanner 124 or the RFID reader 126.

Next, the CPU 102 determines whether or not a product whose product information has been acquired is a specified product that is a product for which a confirmation procedure performed by a salesclerk is required in the sales (step S304). The specified product is not particularly limited and may be, for example, liquors or tobacco for which an age verification procedure to verify the age of the customer performed by a salesclerk is required in the sales under the Law for Preventing Minors from Drinking or the Law for Prohibiting Minors from Smoking. Note that the confirmation procedure performed by a salesclerk may be those required by a voluntary restraint imposed by an industrial association, a sales rule imposed by a business entity that operates the shop 1, or the like in addition to those required by laws such as the Law for Preventing Minors from Drinking, the Law for Prohibiting Minors from Smoking, or the like. For example, the CPU 102 can determine whether or not the product of interest is the specified product based on the product information on the product read by the code scanner 124 or the RFID reader 126, the product information or the like acquired by referencing the database of the shop server 20, or the like. Further, the CPU 102 may determine whether or not the product of interest is the specified product in accordance with an image recognition process on an image of the product on the register counter 12 captured by the monitoring camera 30, for example.

If the CPU 102 determines that the product is the specified product (step S304, YES), the CPU 102 functions as an interruption unit and interrupts the operation of the checkout device 10 in the self-service register mode (step S306). That is, the CPU 102 interrupts the reading of product information in the self-service register mode.

Next, the CPU 102 performs an action process to call a salesclerk for a confirmation procedure performed by a salesclerk regarding a specified product (step S308). As an action process, the CPU 102 transmits a notification to call a salesclerk to a terminal possessed by the salesclerk or a terminal installed in a backyard or the like where the salesclerk stands by via the network 40, for example. Further, the CPU 102 may sound a call tone to call a salesclerk, for example, as the action process.

Further, the CPU 102 can perform a notification process to notify the customer that a salesclerk is being called together with the action process to call the salesclerk. For example, the CPU 102 can use display on the second display 112, voice guidance, or the like to notify the customer that a salesclerk is being called.

On the other hand, if the CPU 102 determines that the product is not the specified product (step S304, NO), the CPU 102 registers product information on the product (step S310).

Next, the CPU 102 determines whether or not an execution instruction of a checkout process from the customer is input to the checkout device 10 (step S312). The customer is able to input an execution instruction of a checkout process to the checkout device 10 by touch input on the second display 112.

If the CPU 102 determines that there is no input of the execution instruction of the checkout process (step S312, NO), the CPU 102 proceeds to step S302 and continues the acquisition of product information for another product.

On the other hand, if the CPU 102 determines that there is input of the execution instruction of the checkout process (step S312, YES), the CPU 102 performs a checkout process of the product purchased by the customer (step S314).

In such a way, in the present example embodiment, when the checkout device 10 operates in the self-service register mode, the operation of the checkout device 10 in the self-service register mode is interrupted when a specified product requiring a confirmation procedure performed by a salesclerk is included in products purchased by a customer.

Therefore, according to the present example embodiment, it is possible to reliably prevent a specified product from being sold without a confirmation procedure being performed by a salesclerk when the checkout device 10 operates in the self-service register mode.

Note that the specified product may be not only a product requiring a confirmation procedure performed by the salesclerk in the sales but also a product which is not supposed to be sold. The product which is not supposed to be sold is, for example, a food whose best-before date or use-by date has passed.

An RFID tag attached to a food may include expiration date information related to a best-before date or a use-by date. Based on the expiration date information acquired from the RFID tag, the CPU 102 of the checkout device 10 can determine whether or not the product is a food whose best-before date or use-by date has passed, as the determination as to whether or not the product is a specified product in step S304 described above. If the CPU 102 determines that the product is a food whose best-before date or use-by date has passed (step S304, YES), the CPU 102 interrupts the operation in the self-service register mode in the same manner as described above (step S306) and then performs an action process to call a salesclerk (step S308). The called salesclerk may collect a food whose best-before date or use-by date has passed from the customer without selling the food. In such a way, it is possible to manage the best-before date or the use-by date at the time of checkout in the self-service register mode and prevent sales of a food whose best-before date and use-by date has passed that are not supposed to be sold.

Fourth Example Embodiment

A checkout device and a control method of the checkout device according to a fourth example embodiment of the present invention will be described with reference to FIG. 8 and FIG. 9. Note that the same components as those of the checkout device and the control method of the checkout device according to the first to third example embodiments described above are labeled with the same references, and the description thereof will be omitted or simplified.

The configuration of the POS system 2 and the checkout device 10 according to the present example embodiment is the same as that of the POS system 2 and the checkout device 10 according to each of the first to third example embodiments. In the present example embodiment, when a plurality of checkout devices 10 are installed, a case where the operation mode of one checkout device 10 is switched by an operation mode switching instruction provided by another checkout device 10 will be described with reference to FIG. 8 and FIG. 9. FIG. 8 and FIG. 9 are flowcharts illustrating the operation mode switching operation in the checkout device according to the present example embodiment.

Note that, in the following description, one checkout device 10 which is a master that provides an operation mode switching instruction to another checkout device 10 is denoted as "checkout device 10M" where appropriate. Further, the other checkout device 10 which is a slave that switches the operation mode in accordance with the operation mode switching instruction provided by the one checkout device 10 is denoted as "checkout device 10S" where appropriate. Note that, although FIG. 8 and FIG. 9 illustrate cases where there are one checkout device 10M and one checkout device 10S as an example, the example embodiment is not limited thereto. There may be a plurality of checkout devices 10S.

First, a case where the checkout device 10M switches the operation mode of the checkout device 10S to the self-service register mode will be described with reference to FIG. 8. FIG. 8 is a flowchart of the case where the checkout device 10M switches the operation mode of the checkout device 10S to the self-service register mode.

Figure 8:
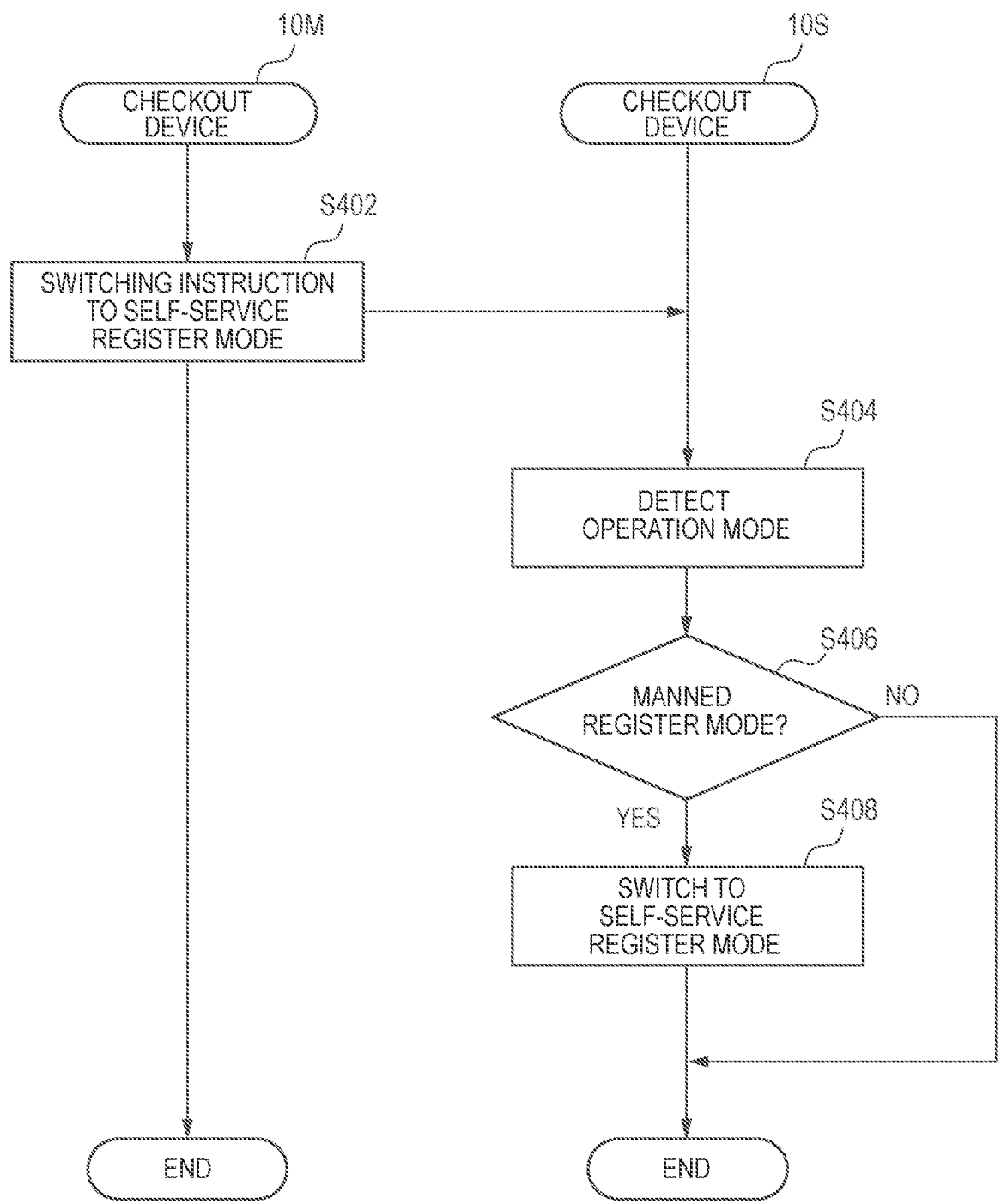
FIG. 8 is a flowchart illustrating an operation of switching the operation mode in a checkout device according to a fourth example embodiment of the present invention.

As illustrated in FIG. 8, the checkout device 10M transmits, to the checkout device 10S via the network 40, a switching instruction that provides an instruction to switch the operation mode to the self-service register mode (step S402). The operation mode of the checkout device 10M may be the manned register mode or may be the self-service register mode. For example, a salesclerk may send an instruction of switching to the self-service register mode from his/her operating checkout device 10M in the manned register mode to the checkout device 10S at which an operating salesclerk is absent.

The checkout device 10S that received the switching instruction from the checkout device 10M detects the operation mode thereof in the same manner as in the first example embodiment (step S404).

Next, the checkout device 10S determines whether or not the operation mode is the manned register mode based on the detection result of the operation mode (step S406).

If the checkout device 10S determines that the operation mode is the manned register mode (step S406, YES), the checkout device 10S switches the operation mode from the manned register mode to the self-service register mode (step S408).

On the other hand, if the checkout device 10S determines that the operation mode is the self-service register mode (step S406, NO), the checkout device 10S maintains the operation mode in the self-service register mode as it stands.

In such a way, the operation mode of the checkout device 10S can be switched to the self-service register mode by a switching instruction from the checkout device 10M. That is, the checkout device 10S can switch the operation mode to the self-service register mode based on the status of the checkout device 10S that is a situation of being required to be switched to the self-service register mode by the switching instruction from the checkout device 10M.

Next, a case where the checkout device 10M switches the operation mode of the checkout device 10S to the manned register mode will be described with reference to FIG. 9. FIG. 9 is a flowchart of the case where the checkout device 10M switches the operation mode of the checkout device 10S to the manned register mode.

Figure 9:
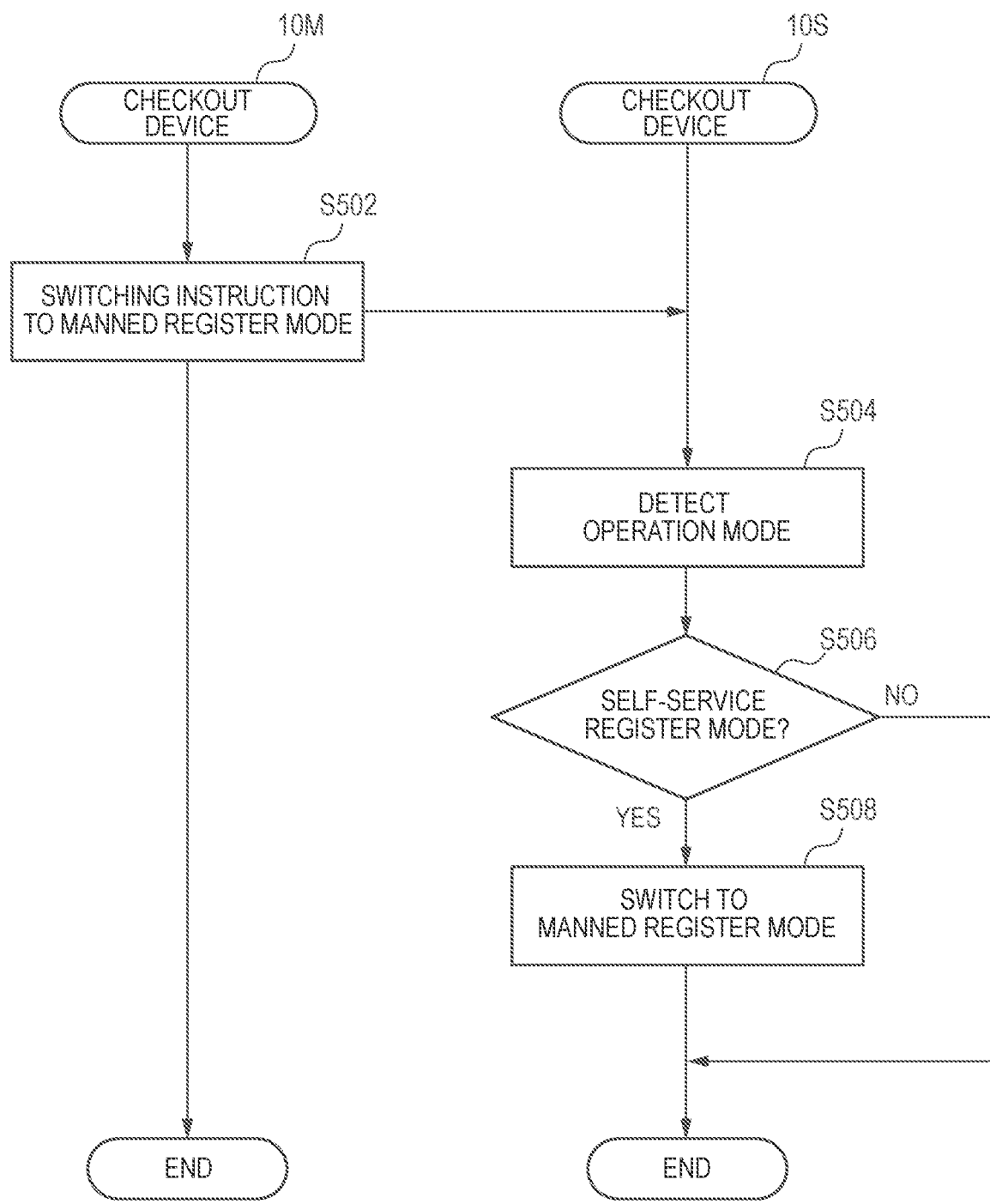
FIG. 9 is a flowchart illustrating an operation of switching of the operation mode in the checkout device according to the fourth example embodiment of the present invention.

As illustrated in FIG. 9, the checkout device 10M transmits, to the checkout device 10S via the network 40, a switching instruction that provides an instruction to switch the operation mode to the manned register mode (step S502). The operation mode of the checkout device 10M may be the manned register mode or may be the self-service register mode. For example, a salesclerk leaving work may switch the operation mode of his/her operating checkout device 10M in the manned register mode to the self-service register mode. Furthermore, a salesclerk leaving work may send an instruction of switching to the manned register mode from the checkout device 10M to the checkout device 10S which is scheduled to be operated by another salesclerk.

The checkout device 10S that received the switching instruction from the checkout device 10M detects the operation mode thereof in the same manner as in the first example embodiment (step S504).

Next, the checkout device 10S determines whether or not the operation mode is the self-service register mode based on the detection result of the operation mode (step S506).

If the checkout device 10S determines that the operation mode is the self-service register mode (step S506, YES), the checkout device 10S switches the operation mode from the self-service register mode to the manned register mode (step S508).

On the other hand, if the checkout device 10S determines that the operation mode is the manned register mode (step S506, NO), the checkout device 10S maintains the operation mode in the manned register mode as it stands.

In such a way, the operation mode of the checkout device 10S can be switched to the manned register mode by a switching instruction from the checkout device 10M. That is, the checkout device 10S can switch the operation mode to the manned register mode based on the status of the checkout device 10S that is a situation of being required to be switched to the manned register mode by the switching instruction from the checkout device 10M.

As with the present example embodiment, the operation mode of one checkout device 10 can be switched by an operation mode switching instruction from another checkout device. Accordingly, the operation mode of one checkout device 10 can be easily changed from another checkout device 10 by a salesclerk who recognizes the status of the shop 1, such as the number of working salesclerks in the shop 1, the degree of congestion in the shop 1, or the like.

Other Example Embodiments

Figure 10:
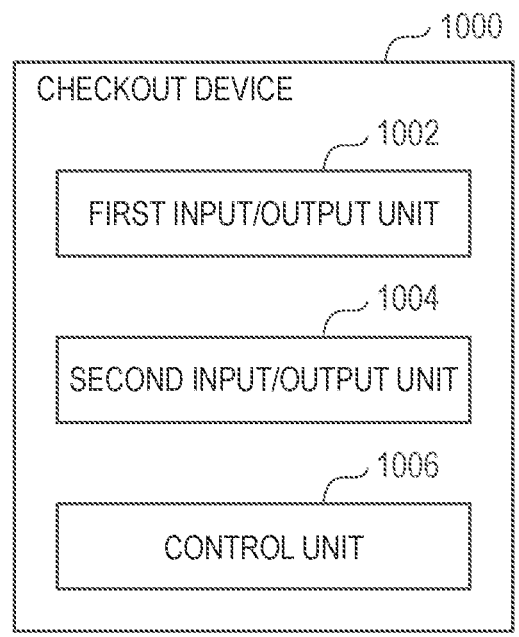
FIG. 10 is a block diagram illustrating a configuration of a checkout device according to another example embodiment of the present invention.

The checkout device described in each of the above example embodiments can also be configured as illustrated in FIG. 10 according to another example embodiment. FIG. 10 is a block diagram illustrating the configuration of the checkout device according to another example embodiment.

As illustrated in FIG. 10, a checkout device 1000 according to another example embodiment has a first input/output unit 1002 and a second input/output unit 1004 provided so as to face different direction from the first input/output unit 1002. Further, the checkout device 10 has a control unit 1006 that selects an input/output unit which accepts input related to a checkout process from the first input/output unit 1002 and the second input/output unit 1004 based on at least one of status of the checkout device 10 and time.

According to the checkout device 1000 of another example embodiment, since the input/output unit that accepts input related to a checkout process is suitably selected from the first input/output unit and the second input/output unit in accordance with the status, a checkout process for a customer can be smoothly performed in accordance with the status.

Figure 11:
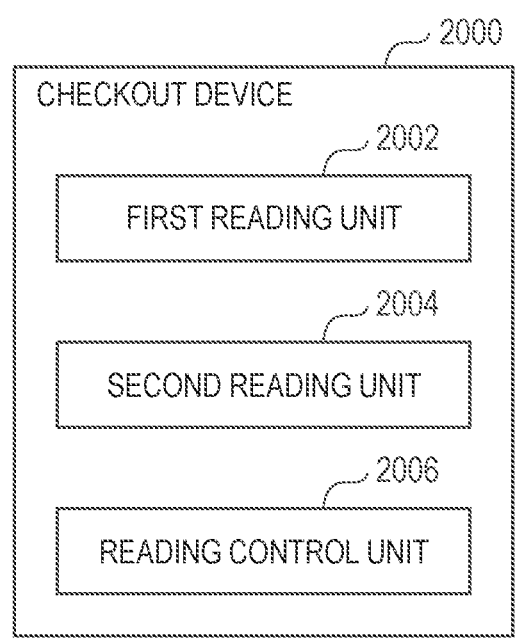
FIG. 11 is a block diagram illustrating a configuration of a checkout device according to yet another example embodiment of the present invention.

Further, the checkout device described in each of the above example embodiments can also be configured as illustrated in FIG. 11 according to yet another example embodiment. FIG. 11 is a block diagram illustrating the configuration of the checkout device according to yet another example embodiment.

As illustrated in FIG. 11, a checkout device 2000 according to yet another example embodiment is a checkout device that can switch the operation mode to the first mode in which product registration is performed by a salesclerk for a product purchased by a customer or the second mode in which product registration is performed by a customer. The checkout device 2000 has a first reading unit 2002 that reads product information on a product, a second reading unit 2004 that reads product information on a product, and a reading control unit 2006 that controls the first reading unit 2002 and the second reading unit 2004 in accordance with the operation mode. The second reading unit 2004 reads the product information on the product in a different scheme from the first reading unit 2002.

According to the checkout device 2000 of yet another example embodiment, a reading unit that can read product information is switched to the first reading unit 2002 or the second reading unit 2004 in accordance with the operation mode of the checkout device 2000. Thus, according to the checkout device 2000 of yet another example embodiment, a more suitable reading unit can be selected in accordance with the operation mode, and therefore a checkout process for a customer can be smoothly performed in accordance with the status.

Modified Example Embodiments

The present invention is not limited to the example embodiments described above, and various modifications are possible.

For example, although the case where the checkout device 10 is used as a POS apparatus used in a shop that sells products has been described as an example in the above example embodiments, the present invention is not limited thereto. The checkout device 10 may be used as a POS apparatus used in a shop that provides services. In such a case, the POS apparatus may be configured to read a code symbol, an RFID tag, or the like issued in the shop in accordance with a provided service, for example, instead of reading a code symbol, an RFID tag, or the like attached to a product.

Further, although the case where the checkout device 10 is a two-screen POS apparatus having the first display 110 and the second display 112 has been described as an example in the above example embodiments, the present invention is not limited thereto. The checkout device 10 may have a single display as the first display 110 and the second display 112. In such a case, the single display functioning as both the displays can be configured such that the orientation and the display content can be changed manually or automatically in accordance with the operation mode of the checkout device 10. Further, the checkout device 10 may have one or a plurality of displays in addition to the first display 110 and the second display 112.

Further, although the case where the checkout device 10 that functions as a POS apparatus is installed on the register counter 12 has been described as an example in the above example embodiments, the present invention is not limited thereto. The checkout device 10 may be formed of a mobile information device such as a smartphone, a tablet terminal, or the like, for example. In such a case, the checkout device 10 may be configured to be carried and used by a salesclerk who is an operator in the manned register mode or a customer who is an operator in the self-service register mode, for example. Further, the checkout device 10 formed of a mobile information device may be configured to be able to be placed on a shopping cart or a shopping basket which a product that a customer wishes to purchase in the shop 1 is put in, for example.

Further, the first to fourth example embodiments described above may be implemented in combination in any manner or may be implemented alone, respectively.

Further, the scope of each of the example embodiments also includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the computer program described above is stored but also the computer program itself.

As the storage medium, for example, a floppy (registered trademark) disk, a hard disk, an optical disk, a magneto-optical disk, a compact disk-read only memory (CD-ROM), a magnetic tape, a nonvolatile memory card, or a ROM can be used. Further, the scope of each of the example embodiments includes an example that operates on operating system (OS) to perform a process in cooperation with another software or a function of an add-in board without being limited to an example that performs a process by an individual program stored in the storage medium.

The whole or part of the example embodiments disclosed above can be described as, but not limited to, the following supplementary notes.

(Supplementary Note 1)

A checkout device comprising:

a first input/output unit;

a second input/output unit provided so as to face a different direction from the first input/output unit; and a control unit that selects an input/output unit which accepts input related to a checkout process from the first input/output unit and the second input/output unit based on at least one of status of the checkout device and time.

(Supplementary Note 2)

The checkout device according to supplementary note 1, wherein based on at least one of the status of the checkout device and the time, the control unit switches an operation mode to a first mode in which product registration is performed by a salesclerk for a product purchased by a customer or a second mode in which product registration is performed by the customer.

(Supplementary Note 3)

The checkout device according to supplementary note 2, wherein the control unit switches the operation mode when a predetermined condition related to at least one of the status of the checkout device and the time is met.

(Supplementary Note 4)

The checkout device according to supplementary note 3, wherein the control unit switches the operation mode when a schedule to switch the operation mode arrives as the case where the predetermined condition is met.

(Supplementary Note 5)

The checkout device according to supplementary note 3 or 4, wherein the control unit switches the operation mode when absence of the salesclerk is detected as the case where the predetermined condition is met.

(Supplementary Note 6)

The checkout device according to supplementary note 5, wherein the control unit switches the operation mode to the second mode when absence of the salesclerk is detected and presence of the customer or the product is detected as the case where the predetermined condition is met.

(Supplementary Note 7)

The checkout device according to any one of supplementary notes 3 to 6, wherein the control unit switches the operation mode when a switching instruction to switch the operation mode is input to the second input/output unit by the customer as the case where the predetermined condition is met.

(Supplementary Note 8)

The checkout device according to supplementary note 7, wherein the second input/output unit has a display unit that displays a screen to the customer side, enables touch input on the screen, and accepts the switching instruction from the customer via the touch input.

(Supplementary Note 9)

The checkout device according to any one of supplementary notes 2 to 8 further comprising an interruption unit that interrupts an operation in the second mode when the checkout device operates in the second mode and a specified product is included in the product.

(Supplementary Note 10)

The checkout device according to any one of supplementary notes 2 to 9 further comprising:

a first reading unit that reads product information on the product;

a second reading unit that reads product information on the product in a scheme that is different from a scheme of the first reading unit; and a reading control unit that controls the first reading unit and the second reading unit in accordance with the operation mode.

(Supplementary Note 11)

A checkout device configured to switch an operation mode to a first mode in which product registration is performed by a salesclerk for a product purchased by a customer or a second mode in which product registration is performed by the customer, the checkout device comprising:

a first reading unit that reads product information on the product;

a second reading unit that reads product information on the product in a scheme that is different from a scheme of the first reading unit; and a reading control unit that controls the first reading unit and the second reading unit in accordance with the operation mode.

(Supplementary Note 12)

A control method of a checkout device having a first input/output unit and a second input/output unit provided so as to face a different direction from the first input/output unit, the control method comprising:

selecting an input/output unit which accepts input related to a checkout process from the first input/output unit and the second input/output unit based on at least one of status of the checkout device and time.

(Supplementary Note 13)

A storage medium storing a program that causes a checkout device having a first input/output unit and a second input/output provided so as to face a different direction from the first input/output unit to select an input/output unit which accepts input related to a checkout process from the first input/output unit and the second input/output unit based on at least one of status of the checkout device and time.

As set forth, although the present invention has been described with reference to the example embodiments, the present invention is not limited to the example embodiments described above. Various modifications that may be understood by those skilled in the art within the scope of the present invention can be made to the configuration and the detail of the present invention.

This application is based upon and claims the benefit of priority from Japanese Patent Application No. 2018-161639, filed on Aug. 30, 2018, the disclosure of which is incorporated herein in its entirety by reference.

REFERENCE SIGNS LIST

1 shop
2 POS system
10 checkout device
12 register counter
20 shop server
30 monitoring camera
40 network
102 CPU
104 RAM
106 storage
108 communication unit
110 first display
112 second display
114 display controller
116 camera
118 microphone
120 external I/F unit
122 bus line
124 code scanner
126 RFID reader
128 contactless IC reader/writer
130 cash drawer 132 automatic change machine
134 receipt printer
136 keyboard
138 human detection unit
140 weight sensor
142 LiDAR sensor
144 product detection unit
1000 checkout device
1002 first input/output unit
1004 second input/output unit
1006 control unit
2000 checkout device
2002 first reading unit
2004 second reading unit
2006 reading control unit

What is claimed is:

1. A checkout device comprising:
a first input/output unit;
a second input/output unit provided so as to face a different direction from the first input/output unit; and
a control unit that selects an input/output unit which accepts input related to a checkout process from the first input/output unit and the second input/output unit based on at least one of status of the checkout device and time,
wherein based on at least one of the status of the checkout device and the time, the control unit switches an operation mode to a first mode in which product registration is performed by a salesclerk for a product purchased by a customer or a second mode in which product registration is performed by the customer,
wherein the control unit switches the operation mode when a predetermined condition related to at least one of the status of the checkout device and the time is met, and
wherein the control unit switches the operation mode to the second mode when absence of the salesclerk is detected and the product is detected as the case where the predetermined condition is met.

2. The checkout device according to claim 1, wherein the control unit switches the operation mode when a schedule to switch the operation mode arrives as the case where the predetermined condition is met.

3. The checkout device according to claim 1, wherein the control unit switches the operation mode to the second mode when absence of the salesclerk is detected and presence of the customer and the product is detected as the case where the predetermined condition is met.

4. The checkout device according to claim 1, wherein the control unit switches the operation mode when a switching instruction to switch the operation mode is input to the second input/output unit by the customer as the case where the predetermined condition is met.

5. The checkout device according to claim 4, wherein the second input/output unit has a display unit that displays a screen to the customer side, enables touch input on the screen, and accepts the switching instruction from the customer via the touch input.

6. The checkout device according to claim 1 further comprising an interruption unit that interrupts an operation in the second mode when the checkout device operates in the second mode and a specified product is included in the product.

7. The checkout device according to claim 1 further comprising:
a first reading unit that reads product information on the product;
a second reading unit that reads product information on the product in a scheme that is different from a scheme of the first reading unit; and
a reading control unit that controls the first reading unit and the second reading unit in accordance with the operation mode.

8. A checkout device configured to switch an operation mode to a first mode in which product registration is performed by a salesclerk for a product purchased by a customer or a second mode in which product registration is performed by the customer, the checkout device comprising:
a first reading unit that reads product information on the product;
a second reading unit that reads product information on the product in a scheme that is different from a scheme of the first reading unit;
a control unit that selects the operation mode based on the at least one of a status of the checkout device and time,
wherein based on at least one of the status of the checkout device and the time, the control unit switches the operation mode from the first mode or the second mode,
wherein the control unit switches the operation mode when a predetermined condition related to at least one of the status of the checkout device and the time is met, and
wherein the control unit switches the operation mode to the second mode when absence of the salesclerk is detected and the product is detected as the case where the predetermined condition is met; and
a reading control unit that controls the first reading unit and the second reading unit in accordance with the selected operation mode.

9. A control method of a checkout device having a first input/output unit and a second input/output unit provided so as to face a different direction from the first input/output unit, the control method comprising:
selecting an input/output unit which accepts input related to a checkout process from the first input/output unit and the second input/output unit based on at least one of status of the checkout device and time; and
based on at least one of a status of the checkout device and the time, switching an operation mode to a first mode in which product registration is performed by a salesclerk for a product purchased by a customer or a second mode in which product registration is performed by the customer,
wherein the operation mode is switched when a predetermined condition related to at least one of the status of the checkout device and the time is met, and
wherein the operation mode is switched to the second mode when absence of the salesclerk is detected and the product is detected as the case where the predetermined condition is met.

10. A checkout device according to claim 8, wherein the control unit includes the reading control unit.

* * * * *